$Mg_xIn_y(OH)_{2x+3y-2z}(CO_3)_z \cdot aH_2O$

United States Patent Office
3,796,792
Patented Mar. 12, 1974

3,796,792
COMPOSITE METAL HYDROXIDES
Shigeo Miyata, Teruhiko Kumura, and Minoru Shimada, Takamatsu, Japan, assignors to Kyowa Chemical Industry Co., Ltd., Tokyo, Japan
Filed Dec. 8, 1970, Ser. No. 96,084
Claims priority, application Japan, Dec. 12, 1969, 44/99,358
Int. Cl. C01g 56/00, 49/00; C01b 35/00
U.S. Cl. 423—250
5 Claims

ABSTRACT OF THE DISCLOSURE

A composite metal hydroxide expressed by the following composition formula:

$$Mg_xM_y{}^{3+}(OH)_{2x+3y-2z}(A^{2-})_z \cdot aH_2O$$

Figure 1:
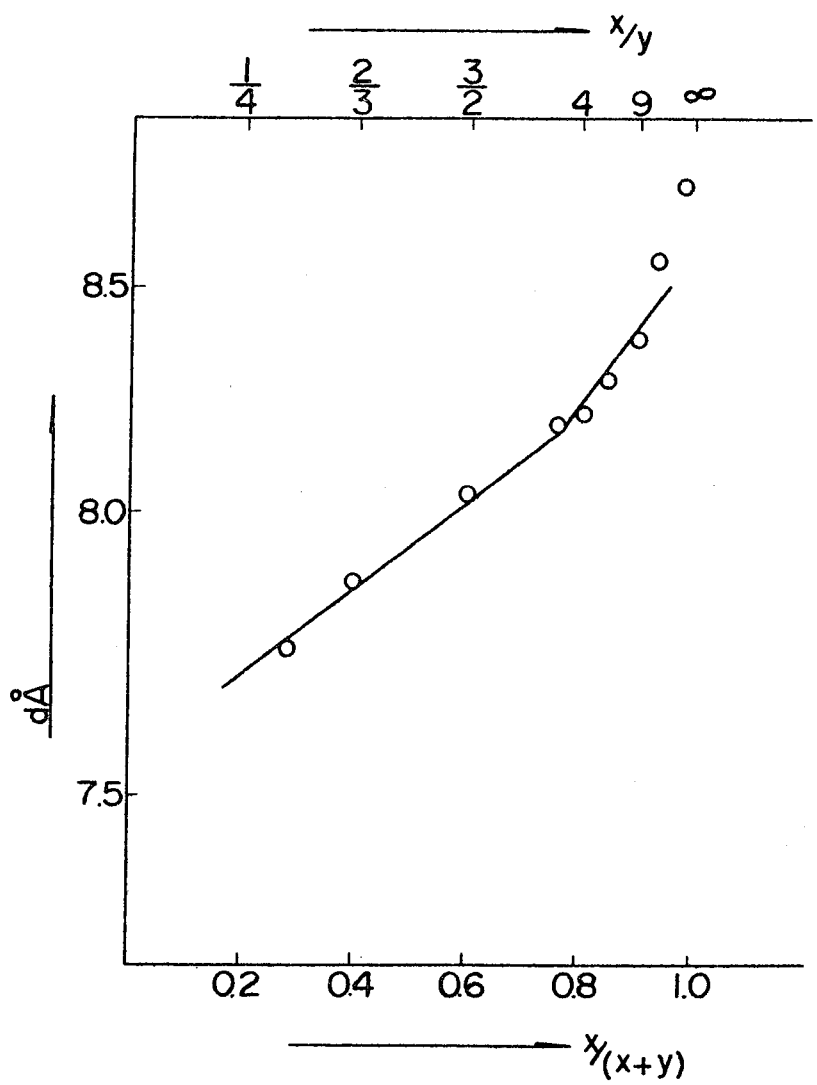

such composite metal hydroxide having a layer crystal structure and exhibiting an endothermal peak owing to isolation of crystal water at a temperature exceeding 170° C. in the differential thermal analysis.

---

This invention relates to novel composite metal hydroxides having a layer crystal structure and to process for the preparation of the same.

More specifically, this invention relates to novel composite metal hydroxides having a layer crystal structure and being expressed by the following composition formula:

$$Mg_xM_y{}^{3+}(OH)_{2x+3y-2z}(A^{2-})_z \cdot aH_2O \quad (I)$$

wherein $M^{3+}$ is a trivalent metal selected from the group consisting of scandium, gallium, yttrium, indium, lanthanum, thallium, titanium, metals of Group V of the Periodic Table, manganese, cobalt, nickel, ruthenium, rhodium, osmium, iridium, rare earth metals and actinide metals; $A^{2-}$ stands for a divalent inorganic anion; and $x$, $y$ $x$ and $a$ are positive numbers satisfying the requirements expressed by the following formulas:

$$1/4 \leq x/y \leq 8,$$

$$1/6 > \frac{z}{x+y} > 1/20$$

and $$0.25 \leq \frac{a}{x+y} \leq 1.0$$

Compounds of the above-mentioned group of this invention have, in common, a layer crystal structure expressed substantially by the following X-ray diffraction pattern;

| d(A.) | Relative intensity (I/I₀) |
|---|---|
| 7.8±3.2 | 100 |
| 3.9±1.6 | 5–80 |
| 3.9±1.6 | 5–80 |
| 2.6±1.2 | 5–60 |
| 1.54±0.05 | 2–10 |
| 1.51±0.05 | 2–10 |

The value of the relative intensity (I/I₀) varies depending on treatment conditions during manufacturing, particularly conditions of the hydrothermal treatment and pressurizing treatment.

A group of composite metal hydroxides having the above layer crystal structure has been named "Andromedite" (which will often be abbreviated as AM hereinbelow).

As the composite metal hydroxide having the above layer crystal structure, hydrotalcite (composition formula=

$$Mg_6Al_2(OH)_{16}CO_3 \cdot 4H_2O)$$

pyroaurite (composition formula=

$$Mg_6Fe_2(OH)_{16}CO_3 \cdot 4H_2O)$$

and stichtite (composition formula=

$$Mg_6Cr_2(OH)_{16}CO_3 \cdot 4H_2O)$$

have been known, each of which is of natural source. These natural minerals, however, are produced only in very small amounts, and since they contain great quantities of impurities, it is extremely difficult to recover these minerals in pure form. For such reason, none of these minerals has yet been used for industrial purposes.

The primary object of this invention is to provide a group of novel composite metal hydroxides having a composition different from those of the above-mentioned natural minerals and having a stable layer crystal structure, and a process for the synthesis of these novel composite metal hydroxides.

Another object of this invention is to provide novel composite metal hydroxides having great utility in a broad application range as an intermediate in the production of a magnetic body, an adsorbent, a dehydrating agent, a catalyst, an intermediate in the production of a catalyst, a pigment, etc.

This invention will be detailed hereinbelow.

Chemical composition of composite metal hydroxide

As the trivalent metal $M^{3+}$ in the above general Formula I scandium; gallium; yttrium; indium; lanthanum (La); thallium; titanium; metals of Group V of the Periodic Table such as vanadium, antimony and bismuth; manganese; cobalt; nickel; ruthenium; rhodium; osmium; iridium; rare earth metals such as cerium, neodymium (Nd), promethium (Pm), samarium (Sm), europium (Eu), gadolinium (Gd), terbium (Tb), dysprosium (Dy), holmium (Ho), erbium (Er), thullium (Tm), ytterbium (Yb), lutetium (Lu) and didymium which is a mixture of various rare earth metals; and actinide metals such as actium (Ac), thorium (Th), protoactinium (Pa), neptunium (Np), plutonium (Pu), americium (Am), curium (Cm), berkelium (Bk), californium (Cf), einsteinium (E), fermium (Fm), mendelevium (Md), nobelium (No) and a mixture of two or more of these actinide metals may be cited. Particularly preferable trivalent metals are yttrium, indium, scandium, gallium, titanium, vanadium, antimony, bismuth, manganese, cobalt and nickel.

Any divalent inorganic ion may be used as $A^{2-}$. As such inorganic ions oxyacid radicals of sulfur, selenium, tellurium (Te), phosphorus, silicon, germanium, tin, boron, vanadium, chromium, molybdenum, tungsten, manganese, ruthenium (Ru), rhodium, osmium and uranium may be mentioned. Specific examples of such oxyacid radicals are $S_2O_3{}^=$, $SO_3{}^=$, $S_2O_6{}^=$, $SO_4{}^=$, $SeO_3{}^=$, $SeO_4{}^=$, $Cr_2O_7{}^=$, $MoO_4{}^=$, $Mo_2O_7{}^=$, $SnO_3{}^=$, $MnO_4{}^=$, $UO_4{}^=$, and $UO_6{}^=$. Halogenic Acid radicals of the above-mentioned metals such as $GeF_6{}^=$, $ZrF_6{}^=$, $SiF_6{}^=$, $SnF_6{}^=$, $TiF_6{}^=$, $PtBr_6{}^=$, and $SbF_5{}^=$; and $S^=$, $CO_3{}^=$, $CS_3{}^=$ and $Pt(CN)_4{}^=$ may also be exemplified. Particularly preferable divalent inorganic ions are $CO_3{}^=$, $CrO_4{}^=$, $Cr_2O_7{}^=$, $B_4O_7{}^=$, $MoO_4{}^=$, $SeO_3{}^=$, $SeO_4{}^=$, $SiO_3{}^=$, $SO_3{}^=$ and $SO_4{}^=$.

Composite metal hydroxides of above Formula I can possess a layer crystal structure when $x$, $y$, $z$ and $a$ satisfy the requirements defined by the above-mentioned inequalities. In composite metal hydroxides of this invention, $x$, $y$, $z$ and $a$ stand most preferably for the following numbers:

$$x=4–8, \ y=2, \ z=0.7–1.4 \text{ and } a=3–5$$

In this case the composite metal hydroxides are expressed by the following compsition formula:

$$Mg_{4-8}M_2{}^{3+}(OH)_{12-20}A^{2-} \cdot 3–5H_2O$$

It has been found, however, that composite metal hydroxides can have a definite layer crystal structure if $x$, $y$, $z$ and $a$ are not such positive numbers but they are numbers with certain ranges. Values of $x$ and $y$ may be varied broadly within the range satisfying the requirement of $1/4 \leq x/y \leq 8$, but in general a good crystal structure is attained within the range of $1.0 \leq x/y \leq 8$. It is particularly preferable that the values of $x$ and $y$ are within the range satisfying $1.2 \leq x/y \leq 3.2$.

References are made to accompanying drawings for a better illustration of this invention.

FIG. 1 represents a diagram of $$Mg_xIn_6(OH)_{2x+3y-2z}(CO_3)_z \cdot aH_2O$$

drawn based on Vegard's rule.

Figure 2:
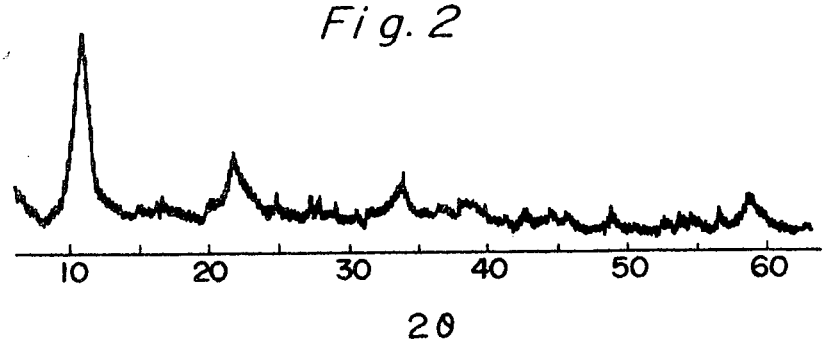

FIG. 2 is an X-ray diffraction diagram of $$Mg In_2(OH)_{16}(CO_3) \cdot 4H_2O$$

Figure 3:
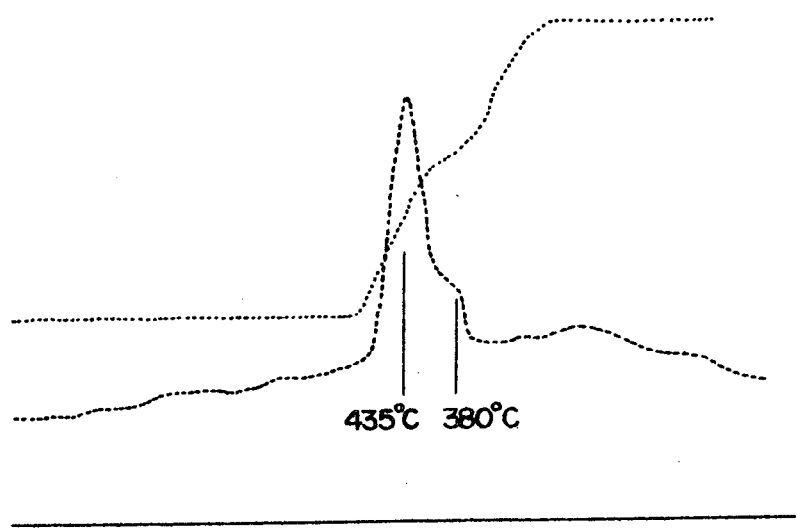

FIG. 3 sets forth differential thermal analysis and thermogravimetric analysis diagrams of $$Mg_6In_2(OH)_{16}(CO_3) \cdot 4H_2O$$

Figure 4:
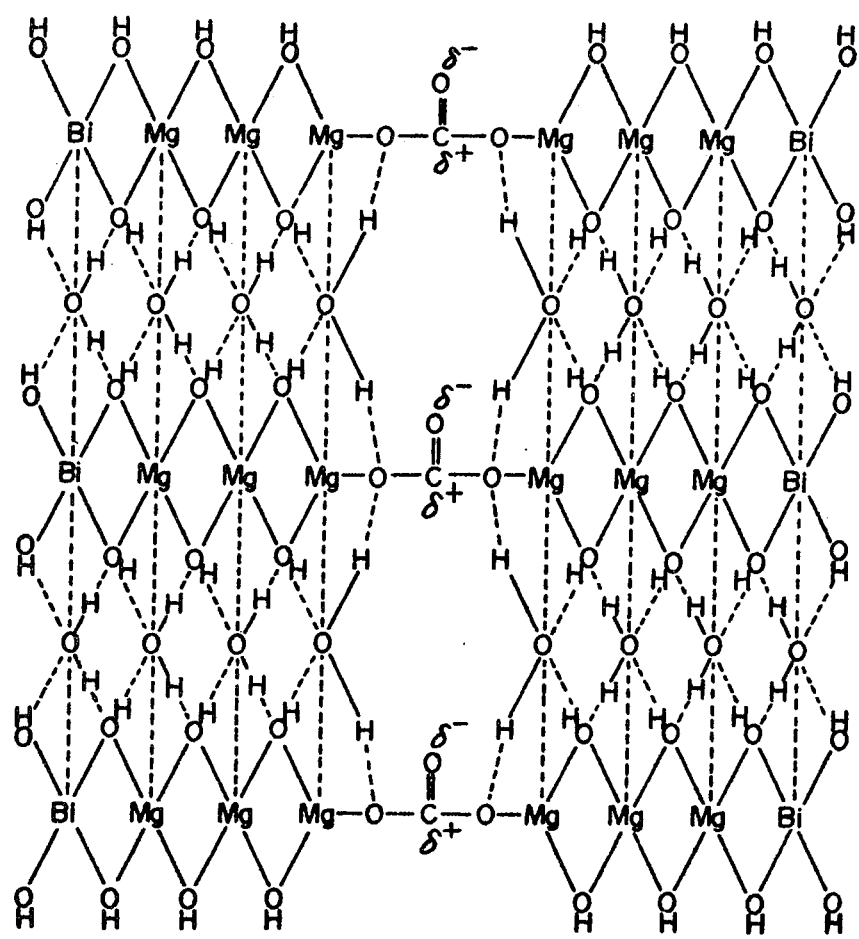

FIG. 4 is a diagram illustrating a presumed structure of $Mg_6Bi_2(CH)_{16}(CO_3) \cdot 4H_2O$ according to this invention.

With reference to, for instance, $$Mg_xIn_y(CH)_{2x+3y-2z}(CO_3)_z \cdot aH_2O$$

the relation between the space distance $d$(A.) and the value of $x/y$ is shown by the curve in FIG. 1. From this curve it is seen that the critical point of the composition resides in the point of $$Mg/(M^{3+}+Mg)=x/(x+y)=2/3-4/5$$

i.e., $Mg/M^{3+}=x/y=2-4$, and that when the value of Mg, i.e., $x$ is beyond this point, the space distance becomes relatively large and when $M^{3+}$, i.e., $y$ is beyond such point, the space distance $d$ becomes small. This tendency is one of general properties of natural minerals forming a mixed crystal. Thus it is apparent that composite metal hydroxides of this invention may form a mixed crystal. The determination of the space density $d$ was effected by X-ray diffraction on samples prepared by dropping Mg, $M^{3+}$ and $A^{2-}$ each in aqueous medium, and NaOH aqueous solution from different burettes while controlling the pH to 9-12, filtering the reaction product suspension, and washing and drying the resulting precipitate.

From the above-mentioned facts it is concluded that crystal lattice points of Mg and $M^{3+}$ may be replaced by $M^{3+}$ and Mg, respectively and that with respect to each of Mg, $M^{3+}$ and $A^{2-}$, two or more ions may be introduced into one crystal lattice point. In general, formation of a mixed crystal is possible within a range of $1/4 \leq x/y \leq 8$.

As is seen from the data shown in Table 1, it is generally necessary that the requirement of $$A^{2-}/(Mg+M^{3+})=z/(x+y) \geq 1/20$$

be satisfied. Considering the crystallinity of products, it is allowable that the quantitative relation among $x$, $y$ and $z$ is within the range of $z/(x+y) \geq 1/200$ but it is particularly preferred that the requirement of $z/(x+y) \geq 1/20$ is satisfied. By X-ray diffraction it was confirmed that each of samples shown in Table 1 was a composite metal hydroxide falling within the scope of this invention.

TABLE 1

| Sample number | Chemical analysis values (molar ratio) | | | $A^{2-}/(Mg+M^{3+})$ $=z/(x+y)$ | Crystallinity (relative value of peak height at (006) face) |
|---|---|---|---|---|---|
| | Mg | Bi | CO₃ | | |
| | 6.0 | 2 | 1 | 1/8 | 33.1 |
| | 6.2 | 2 | 0.82 | 1/10 | 22.7 |
| | 6.0 | 2 | 0.40 | 1/20 | 20.3 |
| | 6.0 | 2 | 0.04 | 1/200 | 8.1 |
| | 4.0 | 2 | 0.3 | 1/20 | 20.4 |
| | 8.0 | 2 | 0.5 | 1/20 | 21.2 |

It is generally difficult to increase the value of $$z/(x+y)$$

over $1/6$. In composite metal hydroxides of this invention it is particularly preferred that the unequality of $$1/6 \geq z/(x+y) \geq 1/10$$

be satisfied.

As is seen from the data shown in Table 2, within a range forming a mixed crystal, the value of the $a/(x+y)$ is about $1/2$ in most of products. Even in products having a lower crystallinity the value is not smaller than 0.25 and in products having an anion of a larger radius within the said range forming a mixed crystal the value is close to 1. Accordingly, it is essential that the condition of $0.25 \leq a/(x+y) \leq 1.0$ be satisfied. The amount of crystal water was determined by the thermogravimetric analysis, when the data of Table 2 were obtained.

TABLE 2

| Sample number | $M^{2+}$ ($x$) | $M^{3+}$ ($y$) | $A^{2-}$ | Crystal water ($a$) | $x/(x+y)$ | $x/y$ |
|---|---|---|---|---|---|---|
| 1 | Mg | Bi | CO₃ | 1.3 | 0.43 | 0.5 |
| 2 | 3Mg | Bi | CO₃ | 2.5 | 0.50 | 1.5 |
| 3 | 5Mg | Bi | CO₃ | 3.4 | 0.49 | 2.5 |
| 4 | 6Mg | Bi | CO₃ | 4.0 | 0.50 | 3.0 |
| 5 | 7Mg | Bi | CO₃ | 3.8 | 0.42 | 3.5 |
| 6 | 8Mg | Bi | CO₃ | 3.8 | 0.38 | 4 |
| 7 | 10Mg | Bi | CO₃ | 3.8 | 0.32 | 5 |
| 8 | 14Mg | Bi | CO₃ | 4.2 | 0.26 | 7 |
| 9 | 16Mg | Bi | CO₃ | 4.6 | 0.26 | 8 |
| 10 | 6Mg | 2Y | B₄O₇ | 7.0 | 0.88 | 3 |
| 11 | 6Mg | 2In | WO₄ | 5.2 | 0.65 | 3 |

With reference to values of $x$, $y$, $z$ and $a$ of Formula I, individual values of $x$, $z$ and $a$ can be determined from the above-mentioned inequality formulas by giving a value of 2 to $y$ for convenience' sake.

In suitable composite metal hydroxides of this invention, values of $x$, $y$, $z$ and $a$ are as follows:

$$y=2, \; x=2-16, \; z=0.5-2.5, \; 2x+3y-2z=7.5-34,$$

and $$a=1.5-6$$

Typical examples of such preferable composite metal hydroxides are shown below:

(a) Composite metal hydroxides having a composition expressed by the formula $$Mg_{2-16}M^{3+}{}_2(OH)_{7.5-34}A^{2-}{}_{0.5-12.5} \cdot 1.5-6H_2O$$

wherein $M^{3+}$ is selected from vanadium, antimony and bismuth, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

(b) Composite metal hydroxides having a composition expressed by the formula $$Mg_{2-16}M^{3+}{}_2(OH)_{7.5-34}A^{2-}{}_{0.5-2.5} \cdot 1.5-6H_2O$$

wherein $M^{3+}$ is selected from cobalt and nickel, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

(c) Composite metal hydroxides having a composition expressed by the formula $$Mg_{2-16}Mn_2(OH)_{7.5-34}A^{2-}{}_{0.5-2.5} \cdot 1.5-6H_2O$$

wherein $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

(d) Composite metal hydroxides having a composition expressed by the formula $$Mg_{2-16}M^{3+}{}_2(OH)_{7.5-34}A^{2-}{}_{0.5-2.5} \cdot 1.5-6H_2O$$

wherein $M^{3+}$ is selected from indium, gallium, scandium and yttrium and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

Physical and chemical properties of composite metal hydroxide

From results of X-ray diffraction analysis, differential thermal analysis, thermogravimetric analysis and infrared absorption spectrum analysis is construed that the novel composite metal hydroxides of this invention have a layer crystal structure in which crystal water is sandwiched in between layers and which is characterized by the lattice constant of $a_0=3.1$ A. and $C_0=40-70$ A. (varying depending on the kinds of trivalent metal $M^{3+}$ and divalent anion $A^{2-}$). Data of X-ray diffraction ($Cu-K_\alpha$) of $Mg_6In_2(OH)_{16}CO_3 \cdot 4H_2O$, which is a typical example of the composite metal hydroxide of this invention, are shown in Table 3.

TABLE 3

| $d$(A.) | $2\theta$ | $I/I_0$ | $hkl$ |
|---|---|---|---|
| 8.11 | 10.9 | 100 | 006 |
| 4.06 | 21.9 | 25 | 0012 |
| 2.67 | 33.6 | 10 | 024; 0018 |
| 2.34 | 38.5 | 4 | |
| 1.58 | 58.3 | 6 | |
| 1.56 | 59.4 | 4 | |

As described above, the values of the space distance $d$ and relative intensity $I/I_0$ vary depending on the kinds of $M^{3+}$ and $A^{2-}$ and corresponding to the crystallinity. Although the distance at (006) face varies within a range of 3–4 A. but it is possible to easily determine by the above-mentioned X-ray diffraction pattern whether a product falls within the scope of this invention or not. More specifically, the distance of each face of (006), (00$\underline{12}$) and (00$\underline{18}$) in Table 3 varies within the above-mentioned range particularly depending on the kind of divalent anion, but changes of other space distances are very small. Accordingly, the determination can be easily made by comparing the pattern of the part where $d$ is not greater than 2.31 A. and confirming the integral-multiplication change of $d$ corresponding to (006), (00$\underline{12}$) and (00$\underline{18}$) faces. For reference, the X-ray diffraction pattern of

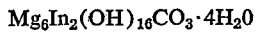

$Mg_6In_2(OH)_{16}CO_3 \cdot 4H_2O$ is shown in FIG. 2. Further, the determination can be performed based on the data of infra-red absorption spectrum analysis those of $Mg_6In_2(OH)_{16}CO \cdot 4H_2O$ are shown in Table 4) and data of differential thermal analysis (D.T.A.) and thermogravimetric analysis (T.G.A.). Results of differential thermal analysis and thermogravimetric analysis of $Mg_6In_2(OH)_{16}CO_3 \cdot 4H_2O$ are shown in FIG. 3. The measuring was conducted at a temperature elevating rate of 5° C./min. in air by using $\alpha$-$Al_2O_3$ as a standard substance.

TABLE 4

$Mg_6In_2(OH)_{16}CO_3 \cdot 4H_2O$

| Wavelength (cm.$^{-1}$): | Absorbed functional group |
|---|---|
| 3450 | OH |
| 1640 | $H_2O$ |
| 1390 | Mg—$CO_3$ |
| 620 | In—O |
| 440 | Mg—O |

The composition of the composite metal hydroxide can be confirmed by the agreement of the value found in the differential thermal analysis and thermogravimetric analysis.

As is seen from FIG. 3, the composite metal hydroxides of this invention exhibit an endothermic peak owing to isolation of crystal water at a temperature higher than substantially 170° C., generally in the range of 200 to 350° C., in the differential thermal analysis. In other words, one of characteristics of the novel composite metal hydroxides of this invention is that the isolation of crystal water is generally caused to occur at high temperatures such as exceeding 200° C.

If an explanation is made by referring to

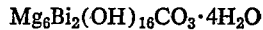

$Mg_6Bi_2(OH)_{16}CO_3 \cdot 4H_2O$ as an example, the composite metal hydroxides of this invention are construed to have a structure shown in FIG. 4, though this invention is not limited to that structure alone. More specifically, in the novel composite metal hydroxides of this invention, it is presumed that

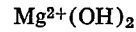

$Mg^{2+}(OH)_2$ is polymerized by the OH linkage to form an oligomer such as the trimer, $M^{3+}(OH)_3$ is polymerized as comonomer with the oligomer, and the divalent anion $A^2$ is linked with the oligomer of $Mg^{2+}(OH)_2$, whereby the skeleton of the layer structure is formed. Further, water is interposed between the so formed layers and layers are bonded to each other by the hydrogen bond and coordination bond.

It is allowable that a part of the divalent metal Mg is substituted by the trivalent metal $M^{3+}$, and it is naturally considered that the amount of crystal water sandwiched in between layers may be varied depending on the ion radius of the divalent anion $A^{2-}$.

The stable crystal structure of the novel substance of this invention will be apparent from the above.

Synthesis of composite metal hydroxide

In accordance with this invention, a process is provided for the preparation of composite metal hydroxides having a layer crystal structure and being expressed by the following composition formula:

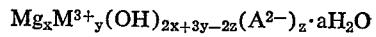

$Mg_xM^{3+}{}_y(OH)_{2x+3y-2z}(A^{2-})_z \cdot aH_2O$ $M^{3+}$ is a trivalent metal selected from the group consisting of scandium, gallium, yttrium, indium, lanthanum, thallium, titanium, metals of Group V of the Periodic Table, manganese, cobalt, nickel, ruthenium, rhodium, osmium, indium, rare earth metals and actinide metals; $A^{2-}$ stands for a divalent inorganic anion; and $x$, $y$, $z$ and $a$ are positive numbers satisfying the requirements expressed by the following formulas:

$$1/4 \leq x/y \leq 8,$$

$$1/6 > \frac{z}{x+y} > 1/20$$

and $$0.25 \leq \frac{a}{x+y} \leq 1.0$$

such process comprising reacting (1) $x$ moles of magnesium hydroxide or a compound capable of forming magnesium hydroxide under the reaction conditions and (2) $y$ moles of a hydroxide of the trivalent metal $M^{3+}$ or a compound capable of forming the hydroxide under the reaction conditions in the presence of at least $z$ moles of the said divalent anion $A^{2-}$ and water at a pH exceeding 7 and a temperature ranging from 0 to 350° C. under such conditions that the requirement expressed by the formula:

$$PS_1 - PS_2 > -1$$

wherein $PS_1$ stands for the stability constant of $Mg(OH)_2$ and $PS_2$ stands for the stability constant of $MgA^{2-}$, will be satisfied.

In the aqueous or water-containing organic solvent medium containing $Mg^{2+}$, $M^{3+}$, $A^{2-}$ and $OH^-$, the following two reactions must be considered:

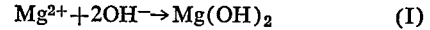

$$Mg^{2+} + 2OH^- \rightarrow Mg(OH)_2 \quad (I)$$

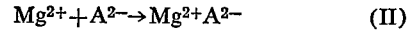

$$Mg^{2+} + A^{2-} \rightarrow Mg^{2+}A^{2-} \quad (II)$$

In case the reaction of Formula II occurs predominantly over the reaction of Formula I, the first condition for arriving at the structure of the product of this invention is not satisfied. Accordingly, it is necessary that the reaction conditions must be maintained such that the reaction of Formula I may occur preferentially. These reaction conditions are determined by the difference of the stability constant between the hydroxide $Mg(OH)_2$ and the metal salt $Mg^{2+}A^{2-}$. The stability constant is defined as follows:

Solubility products (S) of $Mg(OH)_2$ and $Mg^{2+}A^{2-}$ are expressed as follows:

$$[Mg^{2+}][OH^-]^2 = S_1$$

$$[Mg^{2+}][A^{2-}] = S_2$$

The stability is expressed in terms of the reciprocal of the solubility product, i.e., the dissociation constant. Thus the stability constant (K) is calculated as follows:

$$K_1 = \frac{[Mg^{2+}(OH^-)_2]}{[Mg^{2+}][OH^-]^2} = \frac{1}{S_1}$$

$$K_2 = \frac{[Mg^{2+}A^{2-}]}{[Mg^{2+}][A^{2-}]} = \frac{1}{S_1}$$

When the above stability constants are expressed logarithmically, the following formulas are derived:

$$\log K_1 = -\log S_1 = pS_1$$
$$\log K_1 = -\log S_2 = pS_2$$

The reaction conditions can be determined based on these stability constants $pS_1$ and $pS_2$.

In order to cause preferential occurrence of formation of $Mg(OH)_2$, it is necessary to conduct the reaction at a pH precipitating a desired amount of the hydroxide. Values of such pH can be calculated based on the teachings of various references.

As described above, the reaction conditions are determined based on the difference of the stability constant between $Mg(OH)_2$ and $Mg^{2+}A^{2-}$. For instance, when the amount of $OH^-$ fed is almost equivalent to $Mg^{2+}$ and $M^{3+}$, the following three cases results:

(1) $\quad pS_1 - pS_2 \geq 1$

In this case, the reaction of Formula 1 advances preferentially, and all the reaction product is the intended product and no by-product is formed.

(2) $\quad 1 > pS_1 - pS_2 > -1$

In this case, the intended product is obtained but its crystallinity is inferior to the crystallinity of the product in (1).

(3) $\quad pS_1 - pS_2 \leq -1$

In this case, $M^{2+}A^{2-}$ is coincidentally formed and the intended hydroxide is obtained in an impure form.

In order to prevent the formulation of $M^{2+}A^{2-}$, it is advantageous to conduct the reaction in the presence of $OH^-$ in an amount about 2 to about 80 times as large as the amount required for precipitating $Mg^{2+}$ the hydroxide under the condition of $a/(x+y) \leq 1/8$. The competition degree of reactions of Formulas I and II can be contemplated from $pS_1 - pS_2 = K$. Accordingly, optimum conditions for forming and manufacturing the intended AM products can be determined. These conditions are shown in Table 5.

TABLE 5

| | | | Continuous process | | |
| --- | --- | --- | --- | --- | --- |
| Value of K | $(Mg^{2+}+M^{3+})$ | $A^{2-}$ feed | Desired temperature (° C.) | $OH^-$ feed to $(Mg^{2+}+M^{3+})$ optimum for attaining high crystallinity | Yield of AM product (percent) |
| $K \geq 1$ | Almost equivalent | $z/(x+y)$ 1/20 | Below about 100 | Almost equivalent. | 100 |
| $1 \geq K > -1$ | do | $1/20\ z/(x+y)$ 1/8 | Below about 60 | 5-10 equivalents | ca 100 |
| $-1 \geq K$ | More than equivalent | $1/20\ z/(x+y)$ 1/8 | Below about 30 | 10-40 equivalents | >80 |

Note.—Under the condition of $=1>K$, formation of the AM product is apparently observed, but in view of the yield and from the economical view point, it is preferred that the reaction is conducted under the conduction of $K \geq =1$.

The results of reactions which were conducted under such conditions by employing equivalent amounts of the metal salt and alkali are shown in Table 6.

TABLE 6

| Reaction system | $pS_1$ | $pS_2$ | $pS_1-pS_2$ | Final reaction product (typical form) |
| --- | --- | --- | --- | --- |
| $Mg^{2+}$, $SO_4^{2-}$, $Sb^{3+}$ | 10.7 | −0.7 | 11.4 | $Mg_6Sb_2(OH)_{16}SO_4 \cdot 4H_2O$ |
| $Mg^{2+}$, $MoO_4^{2-}$, $Bi^{3+}$ | 10.7 | 0.1 | 10.6 | $Mg_6Bi_2(OH)_{16}MoO_4 \cdot 4H_2O$ |
| $Mg^{2+}$, $SO_3^{2-}$, $In^{3+}$ | 10.7 | 2.4 | 8.3 | $Mg_6In_2(OH)_{16}SO_3 \cdot 4H_2O$ |
| $Mg^{2+}$, $CO_3^{2-}$, $Bi^{3+}$ | 10.7 | 5.0 | 5.7 | $Mg_6Bi_2(OH)_{16}CO_3 \cdot 4H_2O$ |
| $Mg^{2+}$, $GeO_3^{2-}$, $In^{3+}$ | 10.7 | 6.0 | 4.7 | $Mg_6In_2(OH)_{16}(GeO_3) \cdot 4H_2O$ |
| $Mg^{2+}$, $NH_4PO_4^{2-}$, $Bi^{3+}$ | 10.7 | 12.5 | −1.8 | $Mg_6Bi(OH)_{16}(NH_4PO_4) \cdot 4H_2O$ plus $MgNH_4PO_4$ (trace) |

As the starting compound of the divalent metal Mg to be used in the process of this invention, magnesium hydroxide and compounds capable of forming magnesium hydroxide under the reaction conditions may be cited. Typical examples of such compounds are water-soluble inorganic salts of magnesium such as mineral acid salts, e.g., nitrate, halides and sulfate; carbonate and basic carbonate of magnesium; carboxylates of magnesium such as acetate; and alkoxides of magnesium. As the starting compound of the trivalent metal $M^{3+}$, used hydroxides of the trivalent metal $M^{3+}$ and compounds capable of forming the hydroxides under the reaction conditions may be used. As in the case of magnesium there may be mineral acid salts of the trivalent metal $M^{3+}$ such as nitrates, halides and sulfates; carbonates and basic carbonates of the trivalent metal $M^{3+}$; carboxylates of the trivalent metal $M^{3+}$ such as acetates; and alkoxides of the trivalent metal $M^{3+}$ may be used. It is also possible to use double salts of hydroxides of trivalent metal $M^{3+}$ and alkali carbonates.

In accordance with the process of this invention, the above-mentioned starting compounds of magnesium and the above-mentioned starting compounds of the trivalent metal are reacted in the presence of water and of at least $z$ moles of the divalent ion $A^{2-}$ at a pH exceeding 7.

In case starting compounds of magnesium and/or the trivalent metal $M^{3+}$ are salts of the divalent ion $A^{2-}$, it is possible to omit addition of the divalent inorganic ion $A^{2-}$. Further, it is possible to add the divalent inorganic ion $A^{2-}$ in the form of an acid or salt, particularly an alkali metal salt, to the reaction system.

The adjustment of the pH may be performed by adding to the reaction system caustic alkali, alkali carbonate, ammonium hydroxide, ammonium carbonate and the like. In this invention, it is generally preferred that the pH is adjusted within the range of from 9 to 12, though the preferable range of the pH varies to some extent depending on the kind of trivalent metal $M^{3+}$.

In general, the reaction is conducted in water, but it is possible to conduct the reaction by using as the reaction medium a mixture of water and an organic solvent, for instance, a water-miscible organic solvent such as lower alcohols. The reaction is carried out at temperatures ranging from 0 to 350° C., preferably from 0 to 100° C.

In AM products of this invention, $M^3(OH)_3$ is interlocked in the crystal structure in the form of the monomer or oligomer. It is construed that the polymer end of $[Mg(OH)_2]_n$ is made structurally stable by such monomer or oligomer and that two of $M^3(OH)_3$ in neighbouring layers may form a hydrogen bond via crystal water, whereby the layer structure is fixed very tightly and stably. The following cases must be considered:

(a) A trivalent metal does not form a hydroxide but a hydroxide halide $[M^3(OH)_2Hal]$ or an oxyhalide $(M^{3+}OHal)$, or the hydroxide of the trivalent metal is acidic.

(b) A hydroxide of the trivalent metal absorbs oxygen in the air to form a polyvalent hydroxide, as is shown below:

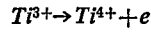
$$Ti^{3+} \rightarrow Ti^{4+} + e$$

In order to solve the problem of case (a), it is preferred to add a complex-forming substance such as the above-mentioned polyhydric alcohols to thereby prevent formation of by-products. For example, in the case of $Bi^{3+}$, $BiOCl$ is formed as a stable by-product.

In order to solve the problem of case (b), it is preferred to conduct the reaction in the above-mentioned non-oxidizing atmosphere.

It is particularly advantageous to conduct the process of this invention by the continuous operation procedures. In this case, aqueous or water-containing alcoholic solutions of $Mg^{2+}$, $M^{3+}$, $A^{2-}$ and $OH^-$ are prepared separately and used. It is also possible to use a combination of a mixed solution of $M^{2+}$ and $M^{3+}$ with a solution of $A^{2-}$ and a solution of $OH^-$ or with a mixed solution of $A^{2-}$ and $OH^-$.

In supplying these solutions continuously to the reaction vessel, the solutions are introduced to the reaction vessel provided with a stirrer and a temperature controlling device of high accuracy at such feed rates that the above-mentionel conditions concerning $x$ and $y$ will be satisfied. As the pH of the reaction liquor greatly influences the quality of the product, it is preferred to control the pH change within a range of ±0.5, particularly ±0.1. Each solution may be supplied through a conduit or sprayed from the top of the reaction vessel. The reaction is terminated when the amount of the reaction mixture arrives at a certain level, and the reaction mixture is withdrawn from the reaction vessel. If desired, the agitation is conducted at a desired temperature for a certain period of time before the withdrawal of the reaction mixture. The recovered reaction mixture is subjected to the solid-liquid separation. The solid is washed with water and is dried at a temperature not causing isolation of crystal water, preferably under reduced pressure. It is particularly advantageous to keep the amount of the reaction mixture constant by means of an overflowing device mounted on the reaction vessel. The crystallinity and physical properties of the product are determined almost by the reaction conditions. In order to keep a homogeneous state in the reaction vessel, it is advantageous to mount pH meters on the upper and lower portions of the reaction vessel and select the reaction conditions so that both pH meters indicate the same value.

As the reaction apparatus, a tube recycle system connected with a centrifugal pump may be adopted. In this case, each solution is fed quantitatively to the suction side of the pump and the pH value is measured just after the extrusion side of the pump to adjust it to a desired value. The amount of the reaction liquor circulated, reaction temperature, the concentrations of starting compounds and the like are suitably arranged, and the reaction mixture in an amount corresponding to the amount of starting solutions fed overflows. The above process is advantageous in that the space of the reaction apparatus is made smaller and the reaction liquor can be agitated vigorously in a small capacity. It is possible to use, instead of a centrifugal pump, an agitator used mainly for the pipe system or other liquid transmitting device. It is preferred that the starting solutions are fed in such amounts that the conditions of $x/y = 1–8$, especially 2–4, and $z/(x+y) = 1\frac{1}{3}$ will be satisfied. With reference to the crystallinity of the product, it is preferable to use $A^{2-}$ in an amount slightly in excess of the amount required for the formation of the product. Accordingly, it is not absolutely necessary to make the ratio of feed materials strictly in accord with the composition in the product.

The process of this invention may be also conducted batchwise. In this case, various operation procedures such as described below may be adopted.

(1) In the same manner as in the continuous process, a mixed solution of $Mg^{2+}$ and $M^{3+}$ in the form of water-soluble metals or organic compounds dissolved in organic solvents is charged in a reaction vessel, and a solution of $A^{2-}$, and $OH^-$ (namely an alkali solution) in an amount almost equivalent to the sum of $Mg^{2+}$ and $M^{3+}$ is added while stirring. The resulting suspension is post-treated in the same manner as in the continuous process.

(2) A solution of $OH^-$ is added to a solution of $Mg^{2+}$ to convert $Mg^{2+}$ almost completely to $Mg(OH)_2$, or both solutions are added to the reaction vessel while maintaining the pH above the level converting $Mg^{2+}$ almost completely to $Mg(OH)_2$. The resulting suspension of magnesium hydroxide is blended with solutions of $M^{3+}$, $A^{2-}$ and $OH^-$ under agitation.

(3) A solution of $OH^-$ is added to an inorganic acid-acidified solution of compounds of $Mg^{2+}$, $M^{3+}$ and $A^{2-}$ under stirring.

(4) A solution of $OH^-$ is added to a solution of $Mg^{2+}$, and $A^{2-}$, or both solutions are continuously blended while maintaining the pH at a prescribed level. To the resulting mixed liquor a solution of $M^{3+}$ and a solution of $OH^-$ are added.

(5) $Mg(OH)_2$, $M^{3+}(OH)_3$ and $A^{2-}$ are dissolved in an aqueous medium at elevated temperatures, and a solution of $OH^-$ is added to the resulting solution and the reaction is conducted preferably for 0.5–10 hours.

(6) When starting compounds other than water-soluble metal salts and metal hydroxides are used, the pH and temperature are so selected that these starting compounds may be converted to hydroxides in an aqueous or organic solvent medium, and then the reaction is carried out in the same manner as in (5) above.

In these operations it is also possible to add $Mg^{2+}$ and $M^{3+}$ to a solution of $OH^-$ and $A^{2-}$.

The continuous process will now be compared with the batchwise process by referring to typical examples.

The pH is elevated from about 1 to values indicated in Table 7, while gradually adding a solution of $CO_3^{2-}$ and $OH^-$ dropwise to an aqueous solution of $Mg^{2+}$ and $In^{3+}$ in the batchwise procedure. The results are shown in Table 7 where results of the continuous procedure are also shown. In this case, the resulting product is $$Mg_6In_2(OH)_{16}CO_3 \cdot 4H_2O$$

TABLE 7

| | Crystallinity of product | |
|---|---|---|
| pH of reaction system | Batchwise reaction | Continuous reaction |
| 8.5 | 0.7 | 1.1 |
| 9 | 0.9 | 4.2 |
| 10 | 3.2 | 14.5 |
| 11 | 3.3 | 14.3 |
| 12 | 0.9 | 11.9 |
| 13 | 2.1 | 10.1 |

The interrelation among reaction conditions in the continuous reaction, and the crystallinity and bulk density of the product is shown in Table 8. The product in this instance is $Mg_6Bi_2(OH)_{16}CO_3 \cdot 4H_2O$.

TABLE 8

| pH | Temperature (° C.) | Crystallinity | Bulk density (ml./g.) |
|---|---|---|---|
| 7.5 | 25 | 3.8 | 2.7 |
| 8.5 | 25 | 7.8 | 2.5 |
| 10 | 25 | 10.1 | 2.9 |
| 11 | 25 | 7.3 | 1.4 |
| 13 | 25 | 4.5 | 1.1 |
| 10 | 58 | 9.9 | 2.9 |

As is seen from the above results, the crystallinity varies depending on the reaction type and reaction conditions, and at the same pH the continuous process gives better crystallinity than the batchwise process. In the continuous process, the crystallinity and properties of the product vary depending on the pH, and it is observed that difference in the color tone or the activity against acid is brought about by the change of the pH. By way of example, the relation between the crystallinity and the acid value after the adsorption treatment observed when $Mg_6Bi_2(OH)_{16} \cdot 4H_2O$ prepared while varying the pH is used as an adsorbent, is shown in Table 9. The acid value after the adsorption treatment is determined in the following manner:

0.5 g. of the product is added to 100 ml. of dipropylene glycol ether (acid value=0.5) containing dissolved therein acetic acid in an amount corresponding to 500 mg./liter of KOH, and the mixture is allowed to stand at 50° C. for 3 hours. The filtrate is titrated with alcoholic KOH by using phenol phthalane as an indicator to determine the remaining amount of acetic acid. The acid value is expressed in terms of milligrams of KOH required for neutralizing 1 ml. of the filtrate.

TABLE 9

| pH | Crystallinity | Acid value after adsorption treatment |
|---|---|---|
| 8.5 | 5 | 0.6 |
| 9.5 | 26 | 0.18 |
| 10 | 29 | 0.09 |
| 11 | 29 | 0.09 |
| 13 | 27 | 0.18 |
| 10 (batchwise process) | 12 | 0.5 |

Synthesis of composite metal hydroxide by ion exchange

In accordance with this invention, a process is provided for the preparation of composite metal hydroxides having a layer crystal structure and being expressed by the following composition formula:

$$Mg_xM_y^{3+}(OH)_{2x+3y-2z}(A^{2-})_z \cdot aH_2O$$

wherein $M^{3+}$ is a trivalent metal selected from the group consisting of scandium, gallium, yttrium, indium, lanthanum, thallium titanium, metals of group V of the Periodic Table, manganese, cobalt, nickel, ruthenium, rhodium, osmium, iridium, rare earth metals and actinide metals; $A^{2-}$ stands for a divalent inorganic anion; and $x$, $y$, $z$ and $a$ are positive numbers satisfying the requirements by the following formulas:

$$1/4 \leq x/y \leq 8,$$

$$1/6 > \frac{z}{x+y} > 1/20$$

and $$0.25 \leq \frac{a}{x+y} \leq 1.0,$$

such process comprising contacting a composite metal hydroxide expressed by the composition formula:

$$Mg_xM_y^{3+}(OH)_{2x+3y=2z}(E^{2-})_z \cdot aH_2O$$

wherein $M^{3+}$, $x$, $y$, $z$ and $a$ are as defined above, and $E^{2-}$ stands for a divalent inorganic anion other than $A^{2-}$, with an aqueous solution containing an excess of a salt expressed by the formula $Q^1Q^2A^{2-}$ wherein $A^{2-}$ is as defined above, $Q^1$ is selected from alkali metals and ammonium group, and $Q^2$ is selected from hydrogen atom, alkali metals and ammonium group.

The anion exchange can be easily performed by contacting an aqueous solution containing the divalent inorganic anion to be introduced, in the form of, for instance, a sodium, potassium or ammonium salt, with the starting composite metal hydroxide containing a divalent inorganic anion different from the divalent inorganic anion to be introduced. In case the solution of the divalent inorganic anion to be introduced is too acidic, there is a tendency that the starting composite metal hydroxide is dissolved therein. Accordingly, it is preferred that the contact is conducted under alkaline conditions, especially at a pH exceeding 8. In view of the treatment time, it is preferred that the concentration of the divalent inorganic anion in the solution to be used is at least 0.01 mole per liter. The contact may be effected sufficiently at room temperature but when the contact is conducted at an elevated temperature ranging from 40 to 90° C., the time required for the contact can be generally shortened. Accordingly, it is preferable to conduct the ion exchange at such elevated temperature. In accordance with the above embodiment, at first an Andromedite composite metal hydroxide is formed with use of a divalent anion having a great value of $K=pS_1-pS_2$, and then an optional divalent anion may be introduced thereinto. This is one of prominent advantages of this invention.

In general, it is preferred that the ion exchange is conducted by a column method, but a solution method may be adopted. By way of example, results of the ion exchange of $Mg_6Bi_2(OH)_{16}CO_3 \cdot 4H_2O$ with various anions are shown in Table 10.

TABLE 10

| Anion added | $CO_2$ content (percent) | X-ray intensity peak height on (006) face (relative value) |
|---|---|---|
| | 5.6 | 12.6 |
| $CrO_4^{2-}$ | 0.07 | 12.5 |
| $SO_4^{2-}$ | 1.82 | 9.8 |
| $SO_3^{2-}$ | 0.03 | 14.9 |
| $SeO_4^{2-}$ | 0.18 | 12.4 |
| $S_4O_7^{2-}$ | 2.4 | 11.8 |
| $TeO_3^{2-}$ | 0.71 | 10.9 |

Post-treatments

The product obtained in accordance with the process of this invention is then subjected to hydrothermal treatment and heat aging treatment to hereby increase is crystallinity. The formation of crystals or growth of crystals is promoted, for instance, by treating an aqueous suspension of the product of this invention or a reaction suspension containing the product of this invention in an autoclave maintained at 100–350° C. under elevated pressure below 300 atmospheres for 0.5 hour–several days, generally 20–50 hours. The heat aging treatment is performed by conducting the heating in a similar manner under atmospheric pressure. Although the heat aging treatment cannot increases the crystallinity as well as the hydrothermal treatment, this can be carried out simply without using any specific treatment device.

After such treatments, the product-containing suspension is cooled and filtered. The recovered product is washed and dried according to need. The post-treatments as well as the reaction may be conducted in an inert gas atmosphere so as to prevent oxidation. Additives such as polymerization inhibitors may be used during post-treatments.

By way of example, the change of the crystallinity by the post-treatment of the reaction suspension obtained in the preparation of $Mg_{10}Bi_2(OH)_{23}3/2SO_4 \cdot 6H_2O$ and having the intended product concentration of 150 grams per liter, is shown in Table 11. The crystallinity is expressed in terms of a relative value of the reciprocal number of the half width at (006) face.

TABLE 11

| Temperature (° C.) | Pressure (atmosphere) | Time (hours) | Crystallinity (relative value) |
|---|---|---|---|
|  |  |  | 12.0 |
| 100 | 1 | 1 | 12.2 |
| 100 | 1 | 3 | 13.9 |
| 100 | 1 | 5 | 14.2 |
| 100 | 1 | 10 | 15.8 |
| 100 | 1 | 15 | 16.7 |
| 150 (hydrothermal treatment) | 5 | 15 | 19.1 |

Use

In composite metal hydroxides of this invention 2 or more elements are optionally combined in the crystal structure optionally. Accordingly, this invention can provide products meeting various demands. For instance, the composite metal hydroxides of this invention are useful as intermediates in the production of magnetic substances, absorbents, dehydrating agents, divalent anion exchangers, catalysts, intermediates of catalysts, medicines such as antacids and astringents, excipients and pigmentary cosmetics. The utility of the products of this invention will now be described.

As a method of preparing ferrite, a low temperature homogeneous calcining method utilizing the coprecipitation technique is excellent, but this method involves problems concerning filtration and impurities and has various defects such as non-uniform growth of crystals. On the other hand, since the product of this invention is obtained by the solution reaction conducted at room temperature under atmospheric pressure, it has a structure that can be suitably converted to a highly magnetic spinel structure, $Mg^{2+}M_2^{3+}+O_4$. Accordingly, the product of this invention is an excellent precursor leading to a highly magnetic substance of a spinel structure. For instance, the product of this invention is converted in a manner shown below by heating at relatively low temperatures:

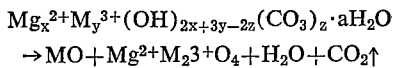

$$Mg_x^{2+}M_y^{3+}(OH)_{2x+3y-2z}(CO_3)_z \cdot aH_2O$$
$$\rightarrow MO + Mg^{2+}M_2^{3+}O_4 + H_2O + CO_2\uparrow$$

(wherein MO stands for an oxide of $Mg^{2+}$ or $M^{3+}$)

Main properties of magnetic substances are determined during the reaction stage. Accordingly, in this point the product of this invention is very advantageous, because the reaction controls can be easily conducted in this invention. Further, the product of this invention is excellent in filterability when compared with conventional hydroxides and is also excellent in that impurities, particularly alkali metals, are hardly incorporated in the product of this invention.

As the product of this invention is a solid which is basic, it can be utilized for adsorption of acidic substances. In the product of this invention, the elution of metals is much lower and the adsorption efficiency is much higher than in the conventional adsorbents. Further, the adsorption efficiency and selectivity can be optionally changed by changing the kinds and composition ratios of metals.

Further, the adsorbent property may be changed by varying the kind of anion. Even if crystal water once interposed between layers has been isolated in the product of this invention, when water is given added thereto, crystal water is formed again in the original position of the crystal structure. In other words, the product of this invention has a substantially complete adsorbent capacity and possess characteristics of a solid base and dehydrating agent coincidentally in on crystal structure. Accordingly, the product of this invention is an adsorbent of great utility which can adsorb an acid and water at the same time.

In order to confirm the reversibility of crystal water, T.G.A. measurement was conducted on Sample (A) obtained by drying $Mg_6Bi_2(OH)_{16}CrO_4 \cdot 4H_2O$, at 105° C. for 3 hours, Sample (B) obtained by calcining sample (A) at 350° C. for 1 hour and Sample (C) obtained by suspending sample (B) in water and drying the same. The results are as follows:

Crystal water content, Percent [1]
Sample A _____ 7.3
Sample B _____ 0.0
Sample C _____ 7.3

[1] Calculated value=7.4%.

The results of X-ray diffraction measurement are as follows:

X-ray diffraction intensity [1]
Sample A _____ 26.4
Sample B _____ 6.9
Sample C _____ 26.3

[1] Diffraction peak height at (006) face.

As shown above, the product of this invention has a reversibility in absorption and isolation of crystal water, and it is therefore utilized as a dehydrating agent. Accordingly, the product of this invention can separate water from an azeotropic mixture of water and an alcohol, the separation of which is impossible by distillation. The product of this invention can absorb hydrogen as well, but it hardly absorbs alcohols such as ethanol, methanol and ethylene glycol, and acetone.

In the product of this invention, the anion can be easily replaced by other divalent anion. Accordingly, the product of this invention can be used as an ion exchanger.

In view of the composition of the product of this invention, its use as a catalyst is expected. Further, it is sometimes useful as an intermediate leading to the preparation of a catalyst. In the case of catalysts prepared by the co-precipitation method, it is considered that each atom is easily coagulated and the atom arrangement is of poor regularily. Accordingly, the distribution of catalytic points is irregular and the catalytic activity is not uniform. Further, as coagulation of atoms is present in such catalyst, there is a fear that it is easily deactivated. On the other hand, as the precipitate of the product of this invenion has a crystal structure, coagulation of atoms is difficultly caused to occur and all the atoms are arranged regularly with little disorder. When measured according to X-ray diffraction analysis or from a microscopic photograph, the layer of the crystal structure of the product of this invention is usually found to have a thickness of less than 100 A. Accordingly, it is construed that in the product of this invention crystal layers grow very thinly. Therefore, when the product of this invention is calcined at temperatures within a certain range, it takes a particulate form in which each atom is in the amorphous state. Thus, the activity is uniform and selective, and a catalyst can be obtained which is hardly degraded by catalyst poison. Further, activities as solid base and specific oxidation and reduction activities can be obtained by suitably selecting a combination of metal and anion. With reference to composite metal hydroxides containing bismuth, vanadium, cobalt or nickel as the trivalent metal $M^{3+}$ and $CO_3^=$, $CrO_4^=$, $Cr_2O_7^=$, $B_4O_7^=$, $MoO_4^=$, $SeO_4^=$ or $WO_4^=$ as the divalent inorganic ion $A^{2-}$, use as catalysts for oxidation of olefins, ammoxidation of olefins, cracking of petroleum hydrocarbons, alkylation of aromatic compounds and the like is expected.

It is another interesting feature of composite metal hydroxides of this invention that the stability against heat may be varied within a range of about 100° C. by changing the kind of anion. Accordingly, it is possible to change optionally change the maximum activity temperature.

As the product of this invention can contain metals such as magnesium and bismuth, it is useful as a medicine. For instance, Mg-Bi type composite hydroxides are promising as anti-ulcer agents. Further, the composite metal hydroxides of this invention are characterized in that incorporation of a monovalent cation such as $Na^+$ of $K^+$ is extremely small.

In the product of this invention, thin layer crystals are merated in the petal-like or plane plate-like form. Accordingly, when pressure is imposed on the product of this invention, particles are easily combined with one another by bonding ability between layers. Because of this property, the product of this invention is useful as an excipient excellent in tablet-forming property. The hardness of the Mg—Bi—$CO_3$ type product at various compression pressures is measured by a strong cobb hardness meter and is compared with those of conventional excipients. Results are shown in Table 12.

TABLE 12

| Compression pressure (kg./cm.²) | Product of this invention | Alumina gel hydroxide | Crystallized Lactose | Cellulose |
|---|---|---|---|---|
| 318 | 13.6 | 2.4 | 0 | 12.3 |
| 636 | >25 | 6.0 | 0 | 19.8 |
| 955 | >25 | 11.2 | 0.9 | >25 |
| 1,274 | >25 | 16.8 | 1.8 | >25 |
| 1,911 | >25 | >25 | 2.8 | >25 |
| 2,548 | >25 | >25 | 5.8 | >25 |

The product of this invention can also be used as a pigment. Further, when Co, Ni, $CrO_4$, $Cr_2O_9$ or the like is combined in the crystal structure, these components exhibit a certain refractive index (about 1.5) and form fine particles. Accordingly, such product can be used as a transparent or semitransparent pigment by adding it to resins or other materials to be colored. Still further, the product of this invention has a smooth touch and a good luster, and it is useful as a luster-imparting agent and a sizing agent for paper-manufacturing. As the product of this invention has a layer crystal structure, it exhibits a lustrous oily feeling and is uniform in particle size. In addition, the product of this invention is extremely excellent in weatherability, and particularly at room temperature or temperatures below 100° C. it is highly resistant against water and has a suitable moisture-absorbing property. Still further, it exhibits a good affinity or compatibility with organic-substances. Accordingly, it is useful as a substrate of a paste-like or powdery cosmetic.

EXAMPLE 1

A 500-ml. capacity beaker equipped with a pH electrode was charged with water in an amount sufficient to immerse the pH electrode therein, and an acidic liquor or 9.1 g. of $SbCl_3$ and 24.4 g. of $MgCl_2 \cdot 6H_2O$ dissolved in 200 ml. of water and an alkaline liquor of 2.9 g. of $Na_2SO_4$ and 12.8 g. of NaOH dissolved in 200 ml. of water were added dropwise to the beaker at room temperature and atmospheric pressure under agitation by a mini-stirrer while the amounts of both liquors fed were so adjusted that the pH of the system would be maintained at 10.0–11.0. After completion of the reaction, water was removed from resulting precipitates by means of a dehydrating device equipped with a vacuum pump. The precipitates were washed with 200 ml. of water and dried in the air at 80° C. for 10 hours. The reaction and the after-treatment were conducted in the air decarbonated with concentrated KOH aqueous solution. The decarbonated water was used throughout the process. X-ray diffraction analysis results, chemical analysis values and the composition formula derived therefrom of the product are as follows:

Composition formula $Mg_6Sb_2(OH)_{16}SO_4 \cdot 4H_2O$:

$K=11.4$
$x/y=3$
$z/(x+y)=1/8$

X-ray diffraction:

| $d(Å)$ | $I/I_o$ |
|---|---|
| 7.69 | 100 |
| 3.81 | 27 |
| 2.59 | 10 |
| 2.31 | 8 |
| 1.53 | 8 |

Chemical analysis:

| | | |
|---|---|---|
| MgO | 28.5% | (5.97) |
| $Sb_2O_3$ | 34.5% | (1.0) |
| $SO_4$ | 11.3% | (1.0) |
| $H_2O$ | 25.6% | (12.0) |

NOTES:
1. Analysis values wer measured according to fluorescent X-ray analysis method, chelate titrating method and ordinary chemical analysis method.
2. Parenthesized values in "Chemical Analysis" indicate molar ratios.
3. $d(A)$ stands for the space distance determined by X-ray diffraction and $I/I_o$ stands for the intensity ratio expressed in the relative value based on the peak heights measured by X-ray diffraction method.

These matters will apply in a similar manner to subsequent examples.

EXAMPLE 2

A liquor of 9.1 g. of $SbCl_3$ and 24.4 g. of $MgCl_2 \cdot 6H_2O$ dissolved in 200 ml. of water and a liquor of 2.1 g. of $Na_2CO_3$ and 12.8 g. of NaOH dissolved in 200 ml. of water were added dropwise to a 500-ml. capacity beaker charged with 100 ml. of water at room temperature under agitation. The feed rate of each liquor was adjusted so that the pH of the reaction suspension was maintained at 10.0–11.0. After completion of the reaction, the resulting suspension was dehydrated by a dehydrating device equipped with a vacuum pump, and the residue was washed with 200 ml. of water and dried at 80° C. for 10 hours. Results of the analysis of the product are as follows:

Composition formula $Mg_6Sb_2(OH)_{16}CO_3 \cdot 4H_2O$:

$K=5.7$
$x/y=3$
$z/(x+y)=1/8$

X-ray diffraction:

| $d(Å)$ | $I/I_o$ |
|---|---|
| 749 | 100 |
| 3.86 | 41 |
| 2.70 | 16 |
| 2.43 | 12 |
| 1.57 | 8 |

Chemical analysis:

| | | |
|---|---|---|
| MgO | 30.2% | (6.00) |
| $Sb_2O_3$ | 36.5% | (1.0) |
| $CO_2$ | 5.6% | (1.02) |
| $H_2O$ | 27.0% | (12.00) |

EXAMPLE 3

A mixed liquor of 50 ml. of a hydrochloric acid-acidified bismuth solution containing 0.4 moles per liter of $Bi_2O_3$, 50 ml. of a zinc chloride solution containing 2.4 moles per liter of ZnO and 100 ml. of a liquor of 3.6 g. of mannitol dissolved in water, and another mixed liquor of 25.6 ml. of a sodium carbonate solution containing 0.785 mole per liter of $Na_2CO_3$ and 200 ml. of a caustic soda solution containing 2.0 mole per liter of NaOH were added under agitation at a temperature maintained at 5° C. into a 500-ml. capacity beaker charged with 100 ml. of water. The reaction was carried out while the pH of the reaction suspension was maintained at 11.0–12.0. The resulting precipitate was treated in the same manner as in Example 2. Results of the analysis of the product are as follows:

Composition formula $Mg_6Bi_2(OH)_{16}CO_3 \cdot 4H_2O$:

$K=5.7$
$x/y=3$
$z/(x+y)=1/8$

X-ray diffraction:

| $d$(A.) | $I/I_o$ |
|---|---|
| 7.49 | 100 |
| 3.70 | 45 |
| 2.58 | 20 |
| 2.37 | 3 |
| 1.52 | 8 |

Chemical analysis:

| MgO | 25.3% | (6.04) |
|---|---|---|
| $Bi_2O_3$ | 48.4% | (1.0) |
| $CO_2$ | 4.5% | (0.98) |
| $H_2O$ | 22.4% | (12.00) |

EXAMPLE 4

A liquor of 8.8 g. of $InCl_3$ and 24.4 g. of $MgCl_2 \cdot 6H_2O$ dissolved in 200 ml. of water and a liquor of 2.1 g. of $Na_2CO_3$ dissolved in 100 ml. of water were added, together with an aqueous solution containing 3.0 moles per liter of NaOH, dropwise at room temperature under agitation into a 500-ml. capacity beaker charged with 100 ml. of water. The addition of the NaOH aqueous solution was adjusted so that the pH of the reaction suspension was maintained above 12.0. After completion of the reaction, the resulting suspension was post-treated in the same manner as in Example 2. Results of the analysis of the product are as follows:

Composition formula $Mg_6In_2(OH)_{16}CO_3 \cdot 4H_2O$:

$K=5.7$
$x/y=3$
$z/(x+y)=1/8$

X-ray diffraction:

| $d$(A.) | $I/I_o$ |
|---|---|
| 8.26 | 100 |
| 4.09 | 26 |
| 2.69 | 10 |
| 2.00 | 9 |
| 1.58 | 5 |

Chemical analysis:

| MgO | 31.8% | (6.20) |
|---|---|---|
| $In_2O_3$ | 35.4% | (1.0) |
| $CO_2$ | 5.6% | (0.99) |
| $H_2O$ | 27.9% | (12.10) |

EXAMPLE 5

A liter capacity beaker was charged with a liquor of 2.1 g. of $Na_2CO_3$ and 150 g. of NaOH dissolved in 300 ml. of water, and then a liquor of 13.2 g. of $YCl_3 \cdot 6H_2O$ and 24.4 g. of $MgCl_2 \cdot 6H_2O$ dissolved in 300 ml. of water was added dropwise to the content of the beaker at room temperature under agitation. Since $Y^{3+}$ is not easily formed into $Y(OH)_3$ completely in the presence of an equivalent amount of $OH^-$, in this example it was necessary that the $OH^-$ ions be present at high concentrations and in amounts of about 10 equivalents. After completion of the reaction, the resulting suspension was transferred to an autoclave and heat-treated at 150° C. for 15 hours. Then it was cooled to room temperature and treated in the same manner as in Example 1. Results of the analysis of the product are as follows:

Composition formula $Mg_6Y_2(OH)_{16}CO_3 \cdot 4H_2O$:

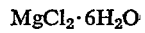

$K=5.7$
$x/y=3$
$z/(x+y)=1/8$

X-ray diffraction:

| $d$(A.) | $I/I_o$ |
|---|---|
| 7.89 | 100 |
| 3.94 | 32 |
| 2.60 | 10 |
| 2.31 | 8 |
| 1.53 | 5 |

Chemical analysis:

| MgO | 33.6% | (6.16) |
|---|---|---|
| $Y_2O_3$ | 30.6% | (1.0) |
| $CO_2$ | 6.8% | (1.09) |
| $H_2O$ | 29.3% | (12.00) |

EXAMPLE 6

An aqueous solution of 4.8 g. of NaOH in 50 ml. of water was added to a liquor of 11.3 g. of $CoSO_4 \cdot 7H_2O$ dissolved in 100 ml. of water to form $Co(OH)_2$. Then the mixed liquor was agitated for 3 days while passing air thereinto, to thereby oxidize $Co(OH)_2$ by oxygen in the air to $Co(OH)_3$. The resulting suspension was charged into a 500-ml. capacity beaker, and a liquor of 24.4 g. of $MgCl_2 \cdot 6H_2O$ dissolved in 200 ml. of water and a liquor of 2.1 g. of $Na_2CO_3$ and 9.6 g. of NaOH dissolved in 100 ml. of water were added dropwise thereto at room temperature under agitation. The resulting reaction suspension was transferred to an autoclave and heat-treated at 150° C. for 15 hours. Then it was cooled to room temperature and post-treated in the same manner as in Example 1. Results of the analysis of the product are as follows:

Composition formula $Mg_6Co_2(OH)_{16}CO_3 \cdot 4H_2O$:

$K=6.1$
$x/y=3$
$z/(x+y)=1/8$

X-ray diffraction:

| $d$(A.) | $I/I_o$ |
|---|---|
| 7.89 | 100 |
| 4.00 | 45 |
| 2.64 | 27 |
| 2.31 | 20 |
| 1.23 | 20 |

Chemical analysis:

| MgO | 36.2% | (5.99) |
|---|---|---|
| $Co_2O_3$ | 24.9% | (1.0) |
| $CO_2$ | 6.6% | (1.00) |
| $H_2O$ | 32.4% | (12.00) |

EXAMPLE 7

A liquor of 3.2 g. of $VCl_3$ and 24.5 g. of $MgCl_2 \cdot 6H_2O$ dissolved in 200 ml. of water and a liquor of 2.1 g. of $Na_2CO_3$ and 13.0 g. of NaOH dissolved in 100 ml. of water were added dropwise in a $N_2$ gas current to a 500-ml. capacity four-neck flask charged with 100 ml. of degasified ion-exchange water. The addition of both liquors were so adjusted that the pH was maintained at 10.0–11.0. After completion of the reaction, the resulting suspension was dehydrated in a $N_2$ gas atmosphere. The remaining solid was dried in a $N_2$ gas current, washed with 100 ml. of degasified ion-exchange water, and dried at 60° C. for 15 hours in a $N_2$ gas current. Results of the analysis of the product are as follows:

Composition formula $Mg_6V_2(OH)_{16}CO_3 \cdot 4H_2O$:

$K=5.7$
$x/y=3$
$z/(x+y)=1/8$

X-ray diffraction:

| $d$(A.) | $I/I_o$ |
|---|---|
| 7.89 | 100 |
| 4.01 | 52 |
| 2.71 | 21 |
| 2.40 | 18 |
| 1.54 | 6 |
| 1.50 | 6 |

Chemical analysis:

| | | |
|---|---|---|
| MgO | 37.1% | (6.00) |
| $V_2O_3$ | 23.8% | (1.0) |
| $CO_2$ | 6.0% | (0.89) |
| $H_2O$ | 33.2% | (12.0) |

EXAMPLE 8

A liquor of 17.5 g. of $Nd(NO_3)_3 \cdot 6H_2O$ and 24.4 g. of $MgCl_2 \cdot 6H_2O$ dissolved in 200 ml. of water and a liquor of 2.1 g. of $Na_2CO_3$ and 12.8 g. of NaOH dissolved in 200 ml. of water were added dropwise to a 500-ml. capacity beaker charged with 60 ml. of water at room temperature under agitation. The addition was conducted so that the pH was maintained at 10.0–11.0, and the reaction was carried out in a $N_2$ gas atmosphere. After completion of the reaction, the resulting suspension was treated in the same manner as in Example 2. Results of the analysis of the product are as follows:

Composition formula $Mg_6Nd_2(OH)_{16}CO_3 \cdot 4H_2O$:

$K=5.7$
$x/y=3$
$z/(x+y)=1/8$

X-ray diffraction:

| $d$(A.) | $I/I_o$ |
|---|---|
| 7.89 | 100 |
| 3.86 | 28 |
| 2.71 | 13 |
| 2.37 | 9 |
| 2.09 | 4 |

Chemical analysis:

| | | |
|---|---|---|
| MgO | 31.1% | (6.02) |
| $Nd_2O_3$ | 35.5% | (1.00) |
| $CO_2$ | 5.7% | (1.00) |
| $H_2O$ | 27.7% | (12.02) |

EXAMPLE 9

40 ml. of an aqueous solution containing 34 mg. of americium nitrate and 49 mg. of $MgCl_2 \cdot 6H_2O$ and a solution of 10 mg. of $Na_2CO_3$ in 10 ml. of water were added dropwise to a 100-ml. capacity beaker charged with 20 ml. of water at room temperature under agitation. The pH of the reaction liquor was adjusted to 10.0–11.5 by addition of 0.1 N NaOH aqueous solution. After completion of the reaction, the resulting suspension was treated in the same manner as in Example 2. Results of X-ray diffraction analysis are as follows:

Composition formula $Mg_6Am_2(OH)_{16}CO_3 \cdot 4H_2O$:

$K=5.7$
$x/y=3$
$z/(x+y)=1/8$

X-ray diffraction:

| $d$(A.) | $I/I_o$ |
|---|---|
| 8.66 | 100 |
| 3.97 | 47 |
| 2.61 | 17 |
| 2.35 | 9 |
| 1.55 | 6 |
| 1.51 | 6 |

EXAMPLE 10

A liquor of 9.1 g. of $SbCl_3$ and 24.4 g. of $MgCl_2 \cdot 6H_2O$ dissolved in 200 ml. of water and a liquor of 3.6 g. of $Na_2CrO_4$ and 12.8 g. of NaOH dissolved in 200 ml. of water were added dropwise to a 500-ml. capacity beaker charged with 100 ml. of water at room temperature under agitation. The feed rate of each liquor was adjusted so that the pH of the reaction suspension was maintained at 10.0–11.0. After completion of the reaction, the resulting suspension was post-treated in the same manner as in Example 1. Results of the analysis of the product are as follows:

Composition formula $Mg_6Sb_2(OH)_{16}CrO_4 \cdot 4H_2O$:

$K=11.5$
$x/y=3$
$z/(x+y)=1/8$

X-ray diffraction:

| $d$(A.) | $I/I_o$ |
|---|---|
| 7.49 | 100 |
| 3.86 | 41 |
| 2.70 | 16 |
| 2.43 | 12 |
| 1.57 | 8 |

Chemical analysis:

| | | |
|---|---|---|
| MgO | 28.0% | (6.02) |
| $Sb_2O_3$ | 33.7% | (1.0) |
| $CrO_4$ | 13.4% | (1.00) |
| $H_2O$ | 25.0% | (12.00) |

EXAMPLE 11

A liquor of 9.1 g. of $SbCl_3$ and 24.4 g. of $MgCl_2 \cdot 6H_2O$ dissolved in 200 ml. of water and a liquor of 2.5 g. of $Na_2SO_3$ and 12.8 g. of NaOH dissolved in 200 ml. of water were added, dropwise into a 500-ml. capacity beaker charged with 100 ml. of water at room temperature under agitation. The addition of each liquor was adjusted so that the pH of the reaction suspension was maintained at 10.0–11.0. After completion of the reaction, the resulting suspension was treated in the same manner as in Example 1. Results of the analysis of the product are as follows:

Composition formula $Mg_6Sb_2(OH)_{16}SO_3 \cdot 4H_2O$:

$K=8.3$
$x/y=3$
$z/(x+y)=1/8$

X-ray diffraction:

| $d$(A.) | $I/I_o$ |
|---|---|
| 7.49 | 100 |
| 3.86 | 41 |
| 2.70 | 16 |
| 2.43 | 12 |
| 1.57 | 8 |

Chemical analysis:

| | | |
|---|---|---|
| MgO | 29.1% | (6.00) |
| $Sb_2O_3$ | 35.1% | (1.0) |
| $SO_3$ | 9.8% | (1.02) |
| $H_2O$ | 26.0% | (12.00) |

EXAMPLE 12

A liquor of 9.1 g. of $SbCl_3$ and 24.4 g. of $MgCl_2 \cdot 6H_2O$ dissolved in 200 ml. of water and a liquor of 4.7 g. of $K_2MoO_4$ and 12.8 g. of NaOH dissolved in 200 ml. of water were added dropwise to a 500-ml. capacity beaker charged wtih 100 ml. of water at room temperature under agitation. The addition was conducted so that the pH was maintained at 10.0–11.0. After completion of the reaction, the resulting suspension was treated in the same manner as in Example 1. Results of the analysis of the product are as follows:

Composition formula $Mg_6Sb_2(OH)_{16}MoO_4 \cdot 4H_2O$:

$K=10.6$
$x/y=3$
$z/(x+y)=1/8$

X-ray diffraction:

| d(A.) | I/I$_o$ |
|---|---|
| 8.93 | 100 |
| 4.90 | 41 |
| 2.67 | 16 |
| 1.52 | 12 |

Chemical analysis:

| MgO | 26.5% | (5.98) |
|---|---|---|
| Sb$_2$O$_3$ | 32.0% | (1.0) |
| MoO$_4$ | 17.9% | (1.02) |
| H$_2$O | 23.7% | (12.00) |

EXAMPLE 13

A liquor of 9.1 g. of SbCl$_3$ and 24.4 g. of MgCl$_2$·6H$_2$O dissolved in 200 ml. of water, and a liquor of 3.5 g. of K$_2$HPO$_4$ and 12.8 g. of NaOH dissolved in 200 ml. of water were added dropwise to a 500-ml. capacity beaker charged with 100 ml. of water at room temperature under agitation. The addition of both liquors was adjusted so that the pH of the reaction suspension was maintained at 10.0–11.0. The resulting suspension was treated in the same manner as in Example 1. Results of the analysis of the product are as follows:

Composition formula Mg$_6$Sb$_2$(OH)$_{16}$HPO$_4$·4H$_2$O:

$K=6.5$
$x/y=3$
$z/(x+y)=1/8$

X-ray diffraction:

| d(A.) | I/I$_o$ |
|---|---|
| 7.49 | 100 |
| 3.86 | 41 |
| 2.70 | 16 |
| 2.43 | 12 |
| 1.57 | 8 |

Chemical analysis:

| MgO | 28.6% | (6.01) |
|---|---|---|
| Sb$_2$O$_3$ | 34.4% | (1.0) |
| HPO$_4$ | 11.6% | (1.02) |
| H$_2$P | 25.5% | (12.00) |

EXAMPLE 14

A liquor of 9.1 g. of SbCl$_3$ and 24.4 g. of MgCl$_2$·6H$_2$O dissolved in 200 ml. of water and a liquor of 4.4 g. of K$_2$SeO$_4$ and 12.8 g. of NaOH dissolved in 200 ml. of water were added dropwise to a 500-ml. capacity beaker charged with 100 ml. of water at room temperature under agitation. The addition of both liquors were so adjusted that the pH was maintained at 10.0–11.0. After completion of the reaction, the resulting suspension was treated in the same manner as in Example 1. Results of the analysis of the product are as follows:

Composition formula Mg$_6$Sb$_2$(OH)$_{16}$SeO$_4$·4H$_2$O:

$K=5.8$
$x/y=3$
$z(x+y)=1/8$

X-ray diffraction:

| d(A.) | I/I$_o$ |
|---|---|
| 7.75 | 100 |
| 3.97 | 41 |
| 2.65 | 16 |
| 1.54 | 12 |

Chemical analysis:

| MgO | 27.0% | (6.0) |
|---|---|---|
| Sb$_2$O$_3$ | 32.6% | (1.0) |
| SeO$_4$ | 16.3% | (1.02) |
| H$_2$O | 24.2% | (12.01) |

EXAMPLE 15

A liquor of 21.0 g. of Ti$_2$(SO$_4$)$_3$·8H$_2$O and 27.4 g. of MgSO$_4$·6H$_2$O dissolved in 200 ml. of dilute hydrochloric acid and an aqueous solution containing 2.0 moles per liter of NaOH were added dropwise into a four-neck flask charged with 100 ml. of water. The reaction was conducted by passing N$_2$ gas through the reaction system so as to prevent the presence of oxygen in the flash and CO$_2$ in the air. The reaction mixture was agitated at room temperature and the pH thereof was maintained above 11.0 by adjusting the addition of the NaOH aqueous solution. After completion of the reaction, the resulting suspension was rapidly filtered under reduced pressure in a N$_2$ gas atmosphere, and the recovered solid was dried at about 60° C. for 8 hours in a N$_2$ gas current, washed under reduced pressure with pure water, and dried under the same conditions as above. Results of the analysis of the product are as follows:

Composition formula Mg$_6$Ti$_2$(OH)$_{16}$SO$_4$·4H$_2$O:

$K=11.4$
$x/y=3$
$z/(x+y)=1/8$

X-ray diffraction:

| d(A.) | I/I$_o$ |
|---|---|
| 8.26 | 100 |
| 4.09 | 52 |
| 2.66 | 18 |
| 2.00 | 9 |
| 1.55 | 6 |

Chemical analysis:

| MgO | 34.6% | (5.84) |
|---|---|---|
| Ti$_2$O$_3$ | 21.2% | (1.0) |
| SO$_4$ | 12.6% | (0.89) |
| H$_2$O | 31.8% | (12.00) |

EXAMPLE 16

A liquor of 17.5 g. of Nd(NO$_3$)$_3$·6H$_2$O and 24.4 g. of MgCl$_2$·6H$_2$O dissolved in 200 ml. of water and a liquor of 3.6 g. of Na$_2$CrO$_4$ and 12.8 g. of NaOH dissolved in 200 ml. of water were added dropwise to a 500-ml. capacity beaker charged with 60 ml. of water at room temperature under agitation. The addition was conducted so that the pH was maintained at 10.0–11.0, and the reaction was carried out in a N$_2$ gas atmosphere. In each liquor, pure water was used. After completion of the reaction, the resulting suspension was hydrothermally treated in an autoclave at 150° C. for 12 hours. Then, it was washed with 200 ml. of water and dried at 70° C. for 10 hours in a N$_2$ gas current. Results of the analysis of the product are as follows:

Composition formula Mg$_6$Nd$_2$(OH)$_{16}$CrO$_4$·4H$_2$O:

$K=11.5$
$x/y=3$
$z/(x+y(=1/8$

X-ray diffraction:

| d(A.) | I/I$_o$ |
|---|---|
| 8.19 | 100 |
| 4.06 | 37 |
| 2.65 | 26 |
| 1.99 | 20 |
| 1.54 | 18 |

Chemical analysis:

| MgO | 29.0% | (6.00) |
|---|---|---|
| Nd$_2$O$_3$ | 33.1% | (1.0) |
| CrO$_4$ | 13.9% | (1.00) |
| H$_2$O | 25.9% | (12.02) |

EXAMPLE 17

A liquor of 15.0 g. of LaCl$_3$·7H$_2$O and 27.4 g. of MgSO$_4$·6H$_2$O dissolved in 200 ml. of water and an aqueous solution containing 2.0 moles per liter of NaOH were added dropwise into a four-neck flask charged with 100 ml. of ion-exchange water. The addition of the NaOH aqueous solution was adjusted so that the pH of the reaction suspension was maintained at 7.0–8.0. The reaction was conducted at room temperature under agitation by passing N$_2$ gas through the flask. After completion of the reaction, the resulting suspension was transferred to an autoclave and subjected to hydrothermal treatment at 150° C. for 10 hours. Then it was cooled, washed with 200 ml. of ion-exchange water and dried at 60° C. for 10 hours in $N_2$ gas. Results of the analysis of the product are as follows:

Composition formula $Mg_6La_2(OH)_{16}SO_4 \cdot 4H_2O$:

$K=11.4$
$x/y=3$
$z/(x+y)=1/8$

X-ray diffraction:

| $d$(A.) | $I/I_o$ |
|---|---|
| 8.03 | 100 |
| 3.85 | 50 |
| 2.64 | 35 |
| 2.40 | 23 |
| 2.09 | 21 |

Chemical analysis:

| | |
|---|---|
| MgO | 27.5% (6.00) |
| $La_2O_3$ | 37.1% (1.00) |
| $SO_4$ | 10.9% (1.00) |
| $H_2O$ | 24.6% (12.00) |

EXAMPLE 18

A liquor of 3.2 g. of $VCl_3$ and 24.5 g. of $MgCl_2 \cdot 6H_2O$ dissolved in 200 ml. of water and a liquor of 3.6 g. of $Na_2CrO_4$ and 13.0 g. of NaOH dissolved in 100 ml. of water were added dropwise in a $N_2$ gas current to a 500 ml. capacity four-neck flask charged with 100 ml. of degasified ion-exchange water. The addition of both liquors were so adjusted that the pH was maintained at 10.0–11.0. After completion of the reaction, the resulting suspension was dehydrated in a $N_2$ gas atmosphere. The remaining solid was dried in a $N_2$ gas current at 60° C., washed with 100 ml. of degasified ion-exchange water, and dried at 60° C. for 15 hours in a $N_2$ gas current. Results of the analysis of the product are as follows:

Composition formula $Mg_6V_2(OH)_{16}CrO_4 \cdot 4H_2O$ $K=11.5$
$x/y=3$
$z/(x+y)=1/8$ X-ray diffraction:

| $d$(A.) | $I/I_o$ |
|---|---|
| 7.89 | 100 |
| 4.02 | 52 |
| 2.71 | 21 |
| 2.41 | 18 |
| 1.53 | 10 |
| 1.50 | 10 |

Chemical analysis:

| | |
|---|---|
| MgO | 34.0% (6.00) |
| $V_2O_3$ | 21.1% (1.00) |
| $CrO_4$ | 14.5% (0.89) |
| $H_2O$ | 30.4% (12.00) |

EXAMPLE 19

A liquor of 15.0 g. of $CeCl_3 \cdot 7H_2O$, 3.0 g. of $NH_4Cl$ and 24.4 g. of $MgCl_2 \cdot 6H_2O$ dissolved in 200 ml. of water and a liquor of 2.5 g. of $Na_2SO_3$ and 13 g. of NaOH dissolved in 200 ml. of water were added dropwise to a four-neck flask charged with 100 ml. of water in a $N_2$ gas atmosphere. The addition of both liquors was adjusted so that the pH of the reaction suspension was maintained above 11.0. Water was removed from the resulting suspension in a $N_2$ gas atmosphere and the residue was dried. The solid was washed with water and dried again in a $N_2$ gas atmosphere at 60° C. for 15 hours. In this example pure water was used. Results of the analysis of the product are as follows:

Composition formula $Mg_6Ce_2(OH)_{16}SO_3 \cdot 4H_2O$:

$K=8.3$
$x/y=3$
$x/(x+y)=1/8$

X-ray diffraction:

| $d$(A.) | $I/I_o$ |
|---|---|
| 7.82 | 100 |
| 3.83 | 45 |
| 2.63 | 25 |
| 2.31 | 18 |
| 1.54 | 10 |
| 1.51 | 8 |

Chemical analysis:

| | |
|---|---|
| MgO | 27.9% (6.06) |
| $Ce_2O_3$ | 37.5% (1.00) |
| $SO_3$ | 9.9% (1.08) |
| $H_2O$ | 24.7% (12.00) |

EXAMPLE 20

100 ml. of a rhodium chloride solution of a concentration of 0.2 mole/liter calculated as $Rh_2O_3$ were mixed with 100 ml. of a magnesium chloride solution of a concentration of 1.2 moles/liter calculated as MgO. Together with the so formed mixed liquor, a mixed liquor of 25.6 ml. of a $Na_2SO_3$ solution of a concentration of 0.8 mole/liter and 80 ml. of a potassium hydroxide solution of a concentration of 4 moles/liter were added dropwise to a 500-ml. capacity beaker charged with 80 ml. of pure water under agitation. The reaction temperature was maintained at 8–10° C. and the pH of the reaction liquor was maintained at 10–11. Water was rapidly removed from the resulting suspension, and the remaining solid was washed with 200 ml. of pure water and dried at 60° C. for 15 hours. The reaction was conducted in a $N_2$ gas atmosphere and pure water was used throughout the example. Results of the analysis of the product are as follows:

Composition formula $Mg_6Rh_2(OH)_{16}SO_3 \cdot 4H_2O$:

$K=8.3$
$x/y=3$
$z/(x+y)=1/8$

X-ray diffraction:

| $d$(A.) | $I/I_o$ |
|---|---|
| 7.79 | 100 |
| 3.72 | 52 |
| 2.59 | 21 |
| 2.38 | 15 |
| 1.52 | 7 |

Chemical analysis:

| | |
|---|---|
| MgO | 30.8% (6.10) |
| $Rh_2O_3$ | 31.8% (1.00) |
| $SO_3$ | 10.1% (1.01) |
| $H_2O$ | 27.3% (12.10) |

EXAMPLE 21

A mixed liquor of 50 ml. of a hydrochloric acid-acidified bismuth solution containing 0.4 mole per liter of $Bi_2O_3$, 50 ml. of a magnesium chloride solution containing 2.4 moles per liter of MgO and 100 ml. of an aqueous solution of 3.6 g. of mannitol, and another mixed liquor of 25.6 ml. of a $Na_2SO_3$ solution of a concentration of 0.785 mole per liter and 200 ml. of a caustic soda solution containing 2.0 moles per liter of NaOH were added at 50° C. under agitation dropwise to a 50-ml. capacity beaker charged with 100 ml. of water. The reaction was conducted while maintaining the pH of the reaction liquor at 11.0–12.0. The resulting suspension was treated in the same manner as in Example 1. Results of the analysis of the product are as follows:

Composition formula $Mg_6Bi_2(OH)_{16}SO_3 \cdot 4H_2O$:
   $K=8.3$
   $x/y=3$
   $z/(x+y)=1/8$ X-ray diffraction:

| d(A.) | I/I$_o$ |
|---|---|
| 7.43 | 100 |
| 3.69 | 45 |
| 2.57 | 20 |
| 2.35 | 13 |
| 1.52 | 10 |

Chemical analysis:
| | |
|---|---|
| MgO | 24.4% (6.06) |
| $Bi_2O_3$ | 46.6% (1.00) |
| $SO_3$ | 7.8% (0.98) |
| $H_2O$ | 21.6% (12.00) |

EXAMPLE 22

A mixed liquor of 50 ml. of a hydrochloric acid-acidified bismuth solution containing 0.4 mole per liter of $Bi_2O_3$, 50 ml. of a magnesium chloride solution containing 2.4 moles per liter of MgO and 100 ml. of an aqueous solution of 3.6 g. of mannitol, and another mixed liquor of 25.6 ml. of $K_2CrO_4$ solution of a concentration of 0.785 mole per liter and 200 ml. of a caustic soda solution containing 2.0 moles per liter of NaOH were added at 50° C. under agitation dropwise to a 500-ml. capacity beaker charged with 100 ml. of water. The reaction was conducted while maintaining the pH of the reaction liquor at 11.0–12.0. The resulting suspension was treated in the same manner as in Example 1. Results of the analysis of the product are as follows:

Composition formula $Mg_6Bi_2(OH)_{16}CrO_4 \cdot 4H_2O$:
   $K=11.5$
   $x/y=3$
   $z/(x+y)=1/8$ X-ray diffraction:

| d(A.) | I/I$_o$ |
|---|---|
| 7.49 | 100 |
| 3.71 | 45 |
| 2.56 | 35 |
| 2.37 | 13 |
| 1.52 | 8 |

Chemical analysis:
| | |
|---|---|
| MgO | 23.5% (6.07) |
| $Bi_2O_3$ | 44.7% (1.00) |
| $CrO_4$ | 11.0% (0.99) |
| $H_2O$ | 20.8% (12.00) |

EXAMPLE 23

A mixed liquor of 50 ml. of a hydrochloric acid-acidified bismuth solution containing 0.4 mole per liter of $Bi_2O_3$, 50 ml. of a magnesium chloride solution containing 2.4 moles per liter of MgO and 100 ml. of an aqueous solution of 4.0 g. of mannitol, and another mixed liquor of 25.6 ml. of $Na_2SO_4$ solution of a concentration of 0.785 mole per liter and 200 ml. of a caustic soda solution containing 2.0 moles per liter of NaOH were added at 50° C. under agitation dropwise to a 500-ml. capacity beaker charged with 100 ml. of water. The reaction was conducted while maintaining the pH of the reaction liquor at 11.0–12.0. The resulting suspension was treated in the same manner as in Example 1. Results of the analysis of the product are as follows:

Composition formula $Mg_6Bi_2(OH)_{16}SO_4 \cdot 4H_2O$:
   $K=11.4$
   $x/y=3$
   $z/(x+y)=1/8$ X-ray diffraction:

| d(A.) | I/I$_o$ |
|---|---|
| 7.60 | 100 |
| 3.83 | 60 |
| 2.58 | 32 |
| 2.37 | 28 |
| 1.52 | 20 |

Chemical analysis:
| | |
|---|---|
| MgO | 23.9% (6.04) |
| $Bi_2O_3$ | 45.7% (1.00) |
| $SO_4$ | 9.2% (0.98) |
| $H_2O$ | 21.3% (12.05) |

EXAMPLE 24

A mixed liquor of 50 ml. of a hydrochloric acid-acidified bismuth solution containing 0.4 mole per liter of $Bi_2O_3$, 50 ml. of a magnesium chloride solution containing 2.4 moles per liter of Mg and 100 ml. of a liquor of 3.6 g. of mannitol dissolved in water, and another mixed liquor of 25.6 ml. of a $Na_2S_2O_3$ solution containing 0.785 mole per liter of $Na_2S_2O_3$ and 200 ml. of a caustic soda solution containing 2.0 moles per liter of NaOH were added under agitation at a temperature maintained at 5° C. into a 500-ml. capacity beaker charged with 100 ml. of water. The reaction was carried out while the pH of the reaction suspension was maintained at 11.0–12.0. The resulting precipitate was treated in the same manner as in Example 1. Results of the analysis of the product are as follows:

Composition formula $Mg_6Bi_2(OH)_{16}S_2O_3 \cdot 4H_2O$:
   $K=11.5$
   $x/y=3$
   $z/(x+y)=1/8$ X-ray diffraction:

| d (A.) | I/I$_o$ |
|---|---|
| 7.82 | 100 |
| 3.93 | 45 |
| 2.59 | 30 |
| 2.39 | 22 |
| 1.53 | 20 |

Chemical analysis:
| | |
|---|---|
| MgO | 23.6% (6.07) |
| $Bi_2O_3$ | 45.0% (1.00) |
| $S_2O_3$ | 10.6% (0.98) |
| $H_2O$ | 20.9% (12.00) |

EXAMPLE 25

A mixed liquor of 50 ml. of a hydrochloric acid-acidified bismuth solution containing 0.4 mole per liter of $Bi_2O_3$, 50 ml. of a magnesium chloride solution containing 2.4 moles per liter of MgO and 100 ml. of a liquor of 3.6 g. of mannitol dissolved in water, and another mixed liquor of 25.6 ml. of a $Na_2HPO_4$ solution containing 0.785 mole per liter of $Na_2HPO_4$ and 200 ml. of a caustic soda solution containing 2.0 moles per liter of NaOH were added under agitation at a temperature maintained at 5° C. into a 500-ml. capacity beaker charged with 100 ml. of water. The reaction was carried out while the pH of the reaction suspension was maintained at 11.0–12.0. The resulting precipitate was treated in the same manner as in Example 1. Results of the analysis of the product are as follows:

Composition formula $Mg_6Bi_2(OH)_{16}HPO_4 \cdot 4H_2O$:
   $K=6.5$
   $x/y=3$
   $z/(x+y)=1/8$ X-ray diffraction:

| d(A.) | I/I$_o$ |
|---|---|
| 7.52 | 100 |
| 3.72 | 45 |
| 2.59 | 20 |
| 2.37 | 13 |
| 1.52 | 8 |

Chemical analysis:

| | | |
|---|---|---|
| MgO | 23.9% | (6.07) |
| $Bi_2O_3$ | 45.6% | (1.00) |
| $HPO_4$ | 9.2% | (0.98) |
| $H_2O$ | 21.2% | (12.04) |

EXAMPLE 26

A liquor of 21.0 g. of $Ti_2(SO_4)_3 \cdot 8H_2O$ and 24.4 g. of $MgCl_2 \cdot 6H_2O$ dissolved in 200 ml. of dilute hydrochloric acid and an aqueous solution containing 2.0 moles per liter of NaOH were added dropwise into a four-neck flask charged with a liquor of 2.1 g. of $Na_2CO_3$ dissolved in 100 ml. of water. The reaction was conducted at room temperature under agitation by passing a $N_2$ gas through the flask to prevent oxygen in the air from being present in the flask and controlling the addition of the NaOH aqueous solution so that the pH of the reaction liquor was maintained above 11.0. After completion of the reaction the resulting suspension was rapidly filtered under reduced pressure in a $N_2$ gas atmosphere, and the residue was dried at about 60° C. for 8 hours in a $N_2$ gas current, washed with 200 ml. of water under reduced pressure and dried again under the same conditions as above. Results of the analysis of the product are as follows:

Composition formula $Mg_6Ti_2(OH)_{16}CO_3 \cdot 4H_2O$:

$K=5.7$
$x/y=3$
$z/(x+y)=1/8$

X-ray diffraction:

| d(A.) | $I/I_o$ |
|---|---|
| 8.19 | 100 |
| 4.06 | 52 |
| 2.65 | 18 |
| 1.99 | 9 |
| 1.56 | 6 |

Chemical analysis:

| | | |
|---|---|---|
| MgO | 37.6% | (5.90) |
| $Ti_2O_3$ | 22.8% | (1.00) |
| $CO_2$ | 6.2% | (0.89) |
| $H_2O$ | 34.3% | (12.00) |

EXAMPLE 27

A liquor of 15.0 g. of $CeCl_3 \cdot 7H_2O$, 3.0 g. of $NH_4Cl$ and 24.4 g. of $MgCl_2 \cdot 6H_2O$ dissolved in 200 ml. of water and a liquor of 2.1 g. of $Na_2CO_3$ and 13.0 g. of NaOH dissolved in 200 ml. of water were added dropwise in a $N_2$ gas atmosphere to a four-neck flask charged with 100 ml. of water. The addition of both liquors was controlled so that the pH of the reaction liquor was maintained above 11.0. After completion of the reaction, water was removed from the resulting suspension in a $N_2$ gas atmosphere, and the residue was dried in the same atmosphere, washed with 200 ml. of water and dried at 60° C. for 15 hours in a $N_2$ gas current. Results of the analysis of the product are as follows:

Composition formula $Mg_6Ce_2(OH)_{16}CO_3 \cdot 4H_2O$:

$K=5.7$
$x/y=3$
$z/(x+y)=1/8$

X-ray diffraction:

| d(A.) | $I/I_o$ |
|---|---|
| 7.89 | 100 |
| 3.85 | 38 |
| 2.64 | 21 |
| 2.37 | 11 |
| 1.53 | 6 |
| 1.50 | 6 |

Chemical analysis:

| | | |
|---|---|---|
| MgO | 29.0% | (6.04) |
| $Ce_2O_3$ | 39.3% | (1.00) |
| $CO_2$ | 5.7% | (1.08) |
| $H_2O$ | 25.8% | (12.00) |

EXAMPLE 28

100 ml. of a rhodium chloride solution of a concentration of 0.2 mole per liter calculated as $Rh_2O_3$ were mixed with 100 ml. of a magnesium chloride solution of a concentratino of 1.2 moles per liter calculated as MgO. The so formed mixed liquor and another mixed liquor of 25.6 ml. of a sodium carbonate solution of a concentration of 0.785 mole per liter and 80 ml. of a potassium hydroxide solution of a concentration of 4 moles per liter were added dropwise to a 500-ml. capacity beaker charged with 80 ml. of water. The temperature was adjusted to 8–10° C. and the pH of the reaction liquor was maintained at 10–11. Water was rapidly removed from the resulting suspension, and the residue was washed with 200 ml. of water and dried at 60° C. for 15 hours. Results of the analysis of the product are as follows:

Composition formula $Mg_6Rh_2(OH)_{16}CO_3 \cdot 4H_2O$:

$K=5.7$
$x/y=3$
$z/(x+y)=1/8$

X-ray diffraction:

| d(A.) | $I/I_o$ |
|---|---|
| 7.82 | 100 |
| 3.78 | 52 |
| 2.60 | 21 |
| 2.40 | 15 |
| 1.52 | 7 |

Chemical analysis:

| | | |
|---|---|---|
| MgO | 32.2% | (6.10) |
| $Rh_2O_3$ | 33.3% | (1.00) |
| $CO_2$ | 5.8% | (1.01) |
| $H_2O$ | 28.6% | (12.10) |

EXAMPLE 29

100 ml. of a hydrochloric acid-acidified bismuth solution (concentration=0.2 mole/liter calculated as $Bi_2O_3$), the pH of which has been adjusted to 1 by addition of hydrochloric acid, were mixed with 100 ml. of a $$MgCl_2 \cdot 6H_2O$$

solution (concentration =1.2 moles/liter calculated as MgO). Together with the so formed mixed liquor, a mixed liquor of 25.6 ml. of a $Na_2SO_3$ solution of a concentration of 0.785 mole/liter and 160 ml. of a caustic soda solution of a concentration of 2.0 moles/liter was added dropwise to a 500-ml. capacity beaker charged with 50 ml. of water. The reaction was conducted at 5° C., while the pH of the reaction liquor was maintained at 11–12. After completion of the reaction, water was removed under reduced pressure, and the remaining solid was washed with 200 ml. of ice water and dried at 50° C. for 20 hours. The reaction and post-treatment were conducted in $N_2$ gas atmosphere, and throughout the example ion-exchange water was used. Results of the analysis of the product are as follows:

Composition formula $Mg_6Bi_2(OH)_{16}SO_3.4H_2O$:

$K=8.3$
$x/y=3$
$x/(x+y)=1/8$

X-ray diffraction:

| d(A.) | $I/I_o$ |
|---|---|
| 7.43 | 100 |
| 3.69 | 45 |
| 2.57 | 20 |
| 2.35 | 13 |
| 1.52 | 10 |

Chemical analysis:

| | | |
|---|---|---|
| MgO | 24.2% | (6.01) |
| $Bi_2O_3$ | 46.6% | (1.0) |
| $SO_3$ | 8.1% | (1.01) |
| $H_2O$ | 21.4% | (11.90) |

EXAMPLE 30

100 ml. of a hydrochloric acid-acidified bismuth solution (concentration=0.2 mole/liter calculated as $Bi_2O_3$), the pH of which had been adjusted to 1 by addition of hydrochloric acid, were mixed with 100 ml. of a $$Mg(NO_3)_2 \cdot 6H_2O$$

solution (concentration=1.2 moles/liter calculated as MgO). Together with the so formed mixed liquor, a mixed liquor of 25.6 ml. of a $K_2MoO_4$ solution of a concentration of 0.785 mole/liter and 160 ml. of a caustic soda solution of a concentration of 2.0 moles/liter was added dropwise to a 500-ml. capacity beaker charged with 50 ml. of water. The reaction was conducted at 50° C., while the pH of the reaction liquor was maintained at 11–12. After completion of the reaction, water was removed under reduced pressure, and the remaining solid was washed with 200 ml. of ice water and dried at 50° C. for 20 hours. The reaction and post-treatment were conducted in $N_2$ gas atmosphere and ion-exchange water was used throughout this example. Results of the analysis of the product are as follows:

Composition formula $Mg_6Bi_2(OH)_{16}MoO_4 \cdot 4H_2O$:

$K=10.6$
$x/y=3$
$z/(x+y)=1/8$

X-ray diffraction:

| $d$(A.) | $I/I_o$ |
|---|---|
| 8.84 | 100 |
| 4.41 | 51 |
| 2.66 | 18 |
| 1.54 | 9 |

Chemical analysis:
| MgO | 22.3% (6.02) |
|---|---|
| $BiO_2O_3$ | 42.9% (1.0) |
| $MoO_4$ | 14.9% (1.01) |
| $H_2O$ | 19.7% (11.88) |

EXAMPLE 31

In 200 ml. of water 8.8 g. of $InCl_3$ and 24.4 g. of $MgCl_2 \cdot 6H_2O$ were dissolved. Separately, 2.5 g. of $Na_2SO_3$ were dissolved in 100 ml. of water. Both liquors were added dropwise to a 500-ml. capacity flask at room temperature under agitation together with an aqueous solution containing 3.0 moles per liter of NaOH while the pH of the mixture was maintained above 12.0. During the reaction air decarbonated with concentrated KOH aqueous solution was fed to the flask. In the decarbonated air the resulting suspension was filtered, and the precipitate was washed with water and dried at 80° C. for 10 hours in the same atmosphere. Results of the analysis of the product are as follows:

Composition formula $Mg_6In_2(OH)_{16} \cdot 4H_2O$:

$K=8.3$
$x/y=3$
$z/(x+y)=1/8$

X-ray diffraction:

| $d$(A.) | $I/I_o$ |
|---|---|
| 8.18 | 100 |
| 4.06 | 48 |
| 2.66 | 36 |
| 2.00 | 9 |
| 1.56 | 10 |

Chemical analysis:
| MgO | 30.4% (6.22) |
|---|---|
| $In_2O_3$ | 33.7% (1.0) |
| $So_3$ | 9.6% (0.99) |
| $H_2O$ | 26.4% (12.08) |

EXAMPLE 32

In 200 ml. of water 8.8 g. of $InCl_3$ and 16.4 g. of $MgCl_2 \cdot 6H_2O$ were dissolved. Separately, 2.9 g. of $Na_2SO_4$ were dissolved in 100 ml. of water. The reaction was carried out in the same manner as in Example 16 by employing the above liquors together with an aqueous solution containing 3.0 moles per liter of NaOH. Results of the analysis of the product are as follows:

Composition formula $Zn_6In_2(OH)_{16}SO_4 \cdot 4H_2O$:

$K=11.4$
$x/y=3$
$z/(x+y)=1/8$

X-ray diffraction:

| $d$(A.) | $I/I_o$ |
|---|---|
| 8.26 | 100 |
| 4.11 | 36 |
| 2.69 | 22 |
| 2.00 | 9 |
| 1.55 | 8 |

Chemical analysis:
| MgO | 29.8% (6.22) |
|---|---|
| $In_2O_3$ | 33.0% (1.0) |
| $SO_4$ | 11.3% (0.99) |
| $H_2O$ | 26.0% (12.16) |

EXAMPLE 33

In 200 ml. of water 8.8 g. of $InCl_3$ and 24.4 g. of $MgCl_2 \cdot 6H_2O$ were dissolved. Separately, 3.5 g. of $K_2HPO_4$ were dissolved in 100 ml. of water. The reaction was carried out in the same manner as in Example 17 by employing the above liquors together with an aqueous solution containing 3.0 moles per liter of NaOH. Results of the analysis of the product are as follows:

Composition formula $Mg_6In_2(OH)_{16}HPO_4 \cdot 4H_2O$:

$K=6.5$
$x/y=3$
$z/(x+y)=\frac{1}{8}$

X-ray diffraction:

| $d$(A.) | $I/I_o$ |
|---|---|
| 8.34 | 100 |
| 4.15 | 26 |
| 2.70 | 15 |
| 2.21 | 10 |
| 1.55 | 10 |

Chemical analysis:
| MgO | 29.8% (6.22) |
|---|---|
| $In_2O_3$ | 33.0% (1.0) |
| $HPO_4$ | 11.3% (0.99) |
| $H_2O$ | 26.0% (12.16) |

EXAMPLE 34

In 200 ml. of water 8.8 g. of $InCl_3$ and 24.4 g. of $MgCl_2 \cdot 6H_2O$ were dissolved. Separately, 7.5 g. of $K_2Pt(CN)_4$ were dissolved in 100 ml. of water. Both solutions, together with an aqueous solution containing 3.0 moles per liter of NaOH, were reacted in the same manner as in Example 16. Results of the analysis of the product are as follows:

Composition formula $Mg_6In_2(OH)_{16}Pt(CN)_4 \cdot 4H_2O$:

$K=10.7$
$x/y=3$
$z/(x+y)=\frac{1}{8}$

X-ray diffraction:

| $d$(A.) | $I/I_o$ |
|---|---|
| 11.94 | 100 |
| 5.86 | 28 |
| 3.83 | 15 |
| 2.45 | 10 |
| 1.58 | 9 |

Chemical analysis:
| MgO | 24.0% (6.21) |
|---|---|
| $In_2O_3$ | 26.6% (1.0) |
| $Pt(CN)_4$ | 28.4% (0.99) |
| $H_2O$ | 20.9% (12.10) |

EXAMPLE 35

8.8 g. of InCl$_3$ and 24.4 g. of MgCl$_2$·6H$_2$O were dissolved in 200 ml. of water, and separately, 4.7 g. of K$_2$MoO$_4$ were dissolved in 100 ml. of water. The reaction was conducted in the same manner as in Example 17 by employing the above two liquors and a NaOH aqueous solution of a concentration of 3.0 moles per liter. Results of the analysis of the product are as follows:

Composition formula Mg$_6$In$_2$(OH)$_{16}$MoO$_4$·4H$_2$O:

$K=10.6$
$x/y=3$
$z/(x+y)=1/8$

X-ray diffraction:

| $d$(A.) | I/I$_o$ |
| --- | --- |
| 9.60 | 100 |
| 4.57 | 62 |
| 3.04 | 46 |
| 2.23 | 25 |
| 1.56 | 25 |

Chemical analysis:

| MgO | 27.7% (6.22) |
| --- | --- |
| In$_2$O$_3$ | 30.7% (1.0) |
| MoO$_4$ | 17.5% (0.99) |
| H$_2$O | 24.1% (12.10) |

EXAMPLE 36

8.8 g. on InCl$_3$ and 24.4 g. of MgCl$_2$·6H$_2$O were dissolved in 200 ml. of water, and separately, 4.7 g. of K$_2$S$_2$O$_6$ were dissolved in 100 ml. of water. The reaction was carried out in the same manner as in Example 17 by employing the above two liquors and a NaOH aqueous solution of a concentration of 3.0 moles per liter. Results of the analysis of the product are as follows:

Composition formula Mg$_6$In$_2$(OH)$_{16}$S$_2$O$_6$·4H$_2$O:

$K=11.7$
$x/y=3$
$z/(x+y)=1/8$

X-ray diffraction:

| $d$(A.) | I/I$_o$ |
| --- | --- |
| 8.34 | 100 |
| 4.13 | 26 |
| 2.71 | 10 |
| 2.11 | 9 |
| 1.57 | 5 |

Chemical analysis:

| MgO | 27.7% (6.22) |
| --- | --- |
| In$_2$O$_3$ | 30.7% (1.0) |
| S$_2$O$_6$ | 17.5% (0.99) |
| H$_2$O | 24.1% (12.10) |

EXAMPLE 37

The reaction was conducted in the same manner as in Example 17 by employing a liquor of 8.8 g. of InCl$_3$ and 24.4 g. of MgCl$_2$·6H$_2$O dissolved in 200 ml. of water, a liquor of 3.8 g. of K$_2$S$_2$O$_3$ dissolved in 100 ml. of water, and a NaOH aqueous solution of a concentration of 3.0 moles per liter. Results of the analysis of the product are as follows:

Composition formula Mg$_6$In$_2$(OH)$_{16}$S$_2$O$_3$·4H$_2$O:

$K=11.5$
$x/y=3$
$z/(x+y)=1/8$

X-ray diffraction:

| $d$(A.) | I/I$_o$ |
| --- | --- |
| 8.50 | 100 |
| 4.23 | 43 |
| 2.72 | 28 |
| 2.18 | 15 |
| 1.57 | 15 |

Chemical analysis:

| MgO | 29.2% (6.22) |
| --- | --- |
| In$_2$O$_3$ | 32.4% (1.0) |
| S$_2$O$_3$ | 13.0% (0.99) |
| H$_2$O | 25.5% (12.12) |

EXAMPLE 38

The reaction was conducted in the same manner as in Example 17 by employing a liquor of 8.8 g. of InCl$_3$ and 24.4 g. of MgCl$_2$·6H$_2$O dissolved in 200 ml. of water, a liquor of 3.6 g. of Na$_2$CrO$_4$ dissolved in 100 ml. of water, and a NaOH aqueous solution of a concentration of 3.0 moles per liter. Results of the analysis of the product are as follows:

Composition formula Mg$_6$In$_2$(OH)$_{16}$CrO$_4$·4H$_2$O:

$K=11.5$
$x/y=3$
$z/(x+y)=1/8$

X-ray diffraction:

| $d$(A.) | I/I$_o$ |
| --- | --- |
| 8.26 | 100 |
| 4.11 | 35 |
| 2.69 | 20 |
| 2.01 | 10 |
| 1.58 | 8 |

Chemical analysis:

| MgO | 29.0% (6.22) |
| --- | --- |
| In$_2$O$_3$ | 32.2% (1.0) |
| CrO$_4$ | 13.4% (0.99) |
| H$_2$O | 25.4% (12.17) |

EXAMPLE 39

The reaction was conducted in the same manner as in Example 17 by employing a liquor of 8.8 g. of InCl$_3$ and 24.4 g. of MgCl$_2$·6H$_2$O dissolved in 200 ml. of water, a liquor of 4.4 g. of K$_2$Se$_4$ dissolved in 100 ml. of water, and a NaOH aqueous solution of a concentration of 3.0 moles per liter. Results of the analysis of the product are as follows:

Composition formula Mg$_6$In$_2$(OH)$_{16}$SeO$_4$·4H$_2$O:

$K=5.8$
$x/y=3$
$z/(x+y)=1/8$

X-ray diffraction:

| $d$(A.) | I/I$_o$ |
| --- | --- |
| 8.58 | 100 |
| 4.27 | 26 |
| 2.73 | 10 |
| 1.57 | 10 |

Chemical analysis:

| MgO | 28.2% (6.14) |
| --- | --- |
| In$_2$O$_3$ | 31.3% (1.0) |
| SeO$_4$ | 16.0% (0.99) |
| H$_2$O | 24.6% (12.10) |

EXAMPLE 40

The reaction was conducted in the same manner as in Example 17 by employing a liquor of 8.8 g. of InCl$_3$ and 24.4 g. of MgCl$_2$·6H$_2$O dissolved in 200 ml. of water, a liquor of 4.3 g. of K$_2$GeO$_3$ dissolved in 200 ml. of water, and a NaOH aqueous solution of a concentration of 3.0 moles per liter. Results of the analysis of the product are as follows:

Composition formula $Mg_6In_2(OH)_{16}GeO_3 \cdot 4H_2O$:

$K=4.7$
$x/y=3$
$z/(x+y)=1/8$

X-ray diffraction:

| $d$(A.) | $I/I_o$ |
| --- | --- |
| 9.50 | 100 |
| 4.72 | 26 |
| 2.72 | 20 |
| 1.58 | 15 |

Chemical analysis:

| | |
| --- | --- |
| MgO | 28.9% (6.14) |
| $In_3O$ | 32.5% (1.0) |
| $GeO_3$ | 13.8% (0.98) |
| $H_2O$ | 25.2% (11.97) |

EXAMPLE 41

100 ml. of a hydrochloric acid-acidified bismuth solution (concentration=0.2 mole/liter calculated as $Bi_2O_3$), the pH of which had been adjusted to 1 by addition of hydrochloric acid, and 2 g. of glycerin were mixed with 100 ml. of an aqueous solution of $MgCl_2 \cdot 6H_2O$ (concentration=0.2 mole/liter calculated as MgO). Together with the so formed mixed liquor, a mixed liquor of 30 ml. of a sodium carbonate solution of a concentration of 0.08 mole/liter and 160 ml. of a caustic soda solution of a concentration of 2.0 moles/liter was added dropwise to a 500-ml. capacity beaker charged with 50 ml. of water. The reaction was conducted at 5° C., while the pH of the reaction liquor was maintained at 10.5–11.5. After completion of the reaction, water was removed under reduced pressure, and the remaining solid was washed with 200 ml. of ice water and dried at 50° C. for 20 hours. Results of the analysis of the product are as follows:

Composition formula $MgBi_2(OH)_{7.2}(CO_3)_{0.4} \cdot 1.3H_2O$:

$K=5.7$
$x/y=1/2$
$z/(x+y)=1/7.5$

X-ray diffraction:

| $d$(A.) | $I/I_o$ |
| --- | --- |
| 7.24 | 100 |
| 3.64 | 51 |
| 2.49 | 18 |
| 1.51 | 15 |

Chemical analysis:

| | |
| --- | --- |
| MgO | 6.6% (1.00) |
| $Bi_2O_3$ | 76.2% (1.0) |
| $CO_2$ | 2.9% (0.40) |
| $H_2O$ | 14.4% (14.90) |

EXAMPLE 42

2 g. of glycerin and 100 ml. of a bismuth solution (concentration=0.2 mole per liter calculated as $Bi_2O_3$), the pH of which was adjusted to 1 by addition of hydrochloric acid, were mixed with 100 ml. of an aqueous solution of $MgCl_2 \cdot 6H_2O$ (concentration=0.6 mole per liter). Together with the so formed mixed liquor, a mixed liquor of 30 ml. of a sodium carbonate solution of a concentration of 0.4 mole per liter and 160 ml. of a caustic soda solution of a concentration of 2.0 moles per liter was added dropwise to a 500-ml. capacity beaker charged with 50 ml. of water. The reaction temperature was maintained at 5° C. and the pH of the reaction mixture was maintained at 10.8–12. The resulting suspension was subjected to the water-removing treatment under reduced pressure, and the residue was washed with 200 ml. of ice water and dried at 50° C. for 20 hours. Results of the analysis of the product are as follows:

Composition formula $Mg_3Bi_2(OH)_{10.7}(CO_3)_{0.63} \cdot 2.5H_2O$:

$K=5.7$
$x/y=1.5$
$z/(x+y)=1/8$

X-ray diffraction:

| $d$(A.) | $I/I_o$ |
| --- | --- |
| 7.37 | 100 |
| 3.66 | 50 |
| 2.52 | 18 |
| 2.35 | 10 |
| 1.54 | 9 |

Chemical analysis:

| | |
| --- | --- |
| MgO | 16.0% (3.00) |
| $Bi_2O_3$ | 61.7% (1.0) |
| $CO_2$ | 3.6% (0.62) |
| $H_2O$ | 18.7% (7.85) |

EXAMPLE 43

2 g. of glycerin and 100 ml. of a hydrochloric acid-acidified bismuth solution of a concentration of 0.2 mole per liter calculated as $Bi_2O_3$, the pH of which was adjusted to 1 by hydrochloric acid, were mixed with 100 ml. of an aqueous solution of $MgCl_2 \cdot 6H_2O$ of a concentration of 1.0 mole per liter calculated as MgO. The resulting mixed liquor and another mixed liquor of 30 ml. of a sodium carbonate solution of a concentration of 0.7 mole per liter and 160 ml. of a caustic soda solution of a concentration of 2.0 moles per liter were added to a 500-ml. capacity beaker charged with 50 ml. of water. The reaction was conducted at 5° C. while maintaining the pH of the reaction liquor at 11–12. Water was removed from the resulting suspension under reduced pressure, and the residue was washed with 200 ml. of ice water and dried at 50° C. for 20 hours. Results of the analysis of the product are as follows:

Composition formula $Mg_5Bi_2(OH)_{14.3}(CO_3)_{0.9} \cdot 3.4H_2O$:

$K=5.7$
$x/y=2.5$
$z/(x+y)=1/7.8$

X-ray diffraction:

| $d$(A.) | $I/I_o$ |
| --- | --- |
| 7.46 | 100 |
| 3.70 | 48 |
| 2.49 | 22 |
| 2.36 | 10 |
| 1.56 | 10 |

Chemical analysis:

| | |
| --- | --- |
| MgO | 22.5% (5.00) |
| $Bi_2O_3$ | 52.0% (1.0) |
| $CO_2$ | 4.4% (0.90) |
| $H_2O$ | 21.2% (10.55) |

EXAMPLE 44

2 g. of glycerin and 100 ml. of a hydrochloric acid-acidified bismuth solution of a concentration of 0.2 mole per liter, the pH of which was adjusted to 1 by addition of hydrochloric acid, were mixed with 100 ml. of an aqueous solution of magnesium sulfate of a concentration of 1.4 moles per liter calculated as MgO. The so formed mixed liquor and another mixed liquor of 30 ml. of a sodium carbonate solution of a concentration of 0.9 mole per liter and 170 ml. of a caustic soda solution of a concentration of 2.0 moles per liter were added to a 500-ml. capacity beaker charged with 50 ml. of water. The reaction was carried out at 5° C. while maintaining the pH of the reaction liquor at 11–12. Water was removed from the resulting suspension under reduced pressure, and the residue was washed with 200 ml. of ice water and dried at 50° C. for 20 hours. Results of the analysis of the product are as follows:

Composition formula $Mg_7Ai_2(OH)_{17.8}(CO_3)_{1.1} \cdot 3.8H_2O$:

$K=5.7$
$x/y=3.5$
$z/(x+y)=1/8.2$

X-ray diffraction:

| $d(A.)$ | $I/I_o$ |
|---|---|
| 7.55 | 100 |
| 3.78 | 51 |
| 2.58 | 18 |
| 2.38 | 13 |
| 1.57 | 9 |

Chemical analysis:

| | |
|---|---|
| MgO | 27.6% (7.00) |
| $Bi_2O_3$ | 45.6% (1.0) |
| $CO_2$ | 4.8% (1.02) |
| $H_2O$ | 22.0% (12.50) |

EXAMPLE 45

2 g. of glycerin and 100 ml. of a hydrochloric acid-acidified bismuth solution of a concentration of 0.2 mole per liter calculated as $Bi_2O_3$, the pH of which was adjusted to 1 by addition of hydrochloric acid, were mixed with 100 ml. of an aqueous solution of magnesium sulfate of a concentration of 1.6 moles per liter calculated as MgO. The so formed mixed liquor and another mixed liquor of 30 ml. of a sodium carbonate solution of a concentration of 1.0 mole per liter and 180 ml. of a caustic soda solution of a concentration of 2.0 moles per liter were added dropwise to a 500-ml. capacity beaker. The reaction was carried out at 5° C. while maintaining the pH of the reaction liquor at 11.3–12.3. Water was removed from the resulting suspension under reduced pressure, and the residue was washed with 200 ml. of ice water and dried at 50° C. for 20 hours. Results of the analysis of the product are as follows:

Composition formula $Mg_8Bi_2(OH)_{19.4}(CO_3)_{1.3} \cdot 3.8H_2O$:

$K=5.7$
$x/y=4$
$z/(x+y)=1/7.7$

X-ray diffraction:

| $d(A.)$ | $I/I_o$ |
|---|---|
| 7.57 | 100 |
| 3.81 | 55 |
| 2.58 | 20 |
| 2.39 | 13 |
| 1.58 | 9 |

Chemical analysis:

| | |
|---|---|
| MgO | 29.9% (8.07) |
| $Bi_2O_3$ | 42.8% (1.0) |
| $CO_2$ | 5.1% (1.26) |
| $H_2O$ | 22.4% (13.52) |

EXAMPLE 46

2 g. of glycerin and 100 ml. of a hydrochloric acid-acidified bismuth solution of a concentration of 0.2 mole per liter calculated as $Bi_2O_3$, the pH of which was adjusted to 1 by addition of hydrochloric acid, were mixed with an aqueous solution of $MgCl_2 \cdot 6H_2O$ of a concentration of 2.0 moles per liter calculated as MgO. The so formed mixed liquor and another mixed liquor of 30 ml. of a sodium carbonate solution of a concentration of 1.4 moles per liter and 200 ml. of a caustic soda solution of a concentration of 2.0 moles per liter were added dropwise to a 500-ml. capacity beaker charged with 50 ml. of water. The reaction was conducted at 5° C., while maintaining the pH of the reaction liquor at 11.5–12.5. Water was removed from the resulting suspension under reduced pressure, and the residue was washed with 200 ml. of ice water and dried at 50° C. for 20 hours. Results of the analysis of the product are as follows:

Composition formula $Mg_{10}Bi_2(OH)_{22.8}(CO_3)_{1.6} \cdot 3.8H_2O$:

$K=5.7$
$x/y=5$
$z/(x+y)=1/7.5$

X-ray diffraction:

| $d(A.)$ | $I/I_o$ |
|---|---|
| 7.66 | 100 |
| 3.83 | 30 |
| 2.58 | 22 |
| 2.41 | 13 |
| 1.58 | 10 |

Chemical analysis:

| | |
|---|---|
| MgO | 33.2% (10.00) |
| $Bi_2O_3$ | 38.4% (1.0) |
| $CO_2$ | 5.7% (1.57) |
| $H_2O$ | 22.8% (15.30) |

EXAMPLE 47

2 g. of glycerin and 100 ml. of a hydrochloric acid-acidified bismuth solution of a concentration of 0.2 mole per liter calculated as $Bi_2O_3$, the pH of which was adjusted to 1 by addition of hydrochloric acid, were mixed with 100 ml. of an aqueous solution of $MgCl_2 \cdot 6H_2O$ of a concentration of 2.8 moles per liter calculated as MgO. The so formed mixed liquor and another mixed liquor of 30 ml. of a sodium carbonate solution of a concentration of 2.0 moles per liter and 200 ml. of a caustic soda solution of a concentration of 3.0 moles per liter were added dropwise to a 500-ml. beaker charged with 50 ml. of water. The reaction was carried out at 5° C. while maintaining the pH of the reaction liquor at 11.5–12.5. Water was removed from the resulting suspension under reduced pressure, and the residue was washed with 200 ml. of water and dried at 50° C. for 20 hours. Results of the analysis of the product are as follows:

Composition formula $Mg_{14}Bi_2(OH)_{29.6}(CO_3)_{2.2} \cdot 4.2H_2O$:

$K=5.7$
$x/y=7$
$z/(x+y)=1/7.3$

X-ray diffraction:

| $d(A.)$ | $I/I_o$ |
|---|---|
| 7.67 | 100 |
| 3.85 | 35 |
| 2.58 | 25 |
| 2.43 | 9 |
| 1.58 | 10 |

Chemical analysis:

| | |
|---|---|
| MgO | 38.5% (14.00) |
| $Bi_2O_3$ | 31.8% (1.0) |
| $CO_2$ | 6.5% (2.16) |
| $H_2O$ | 23.4% (19.10) |

EXAMPLE 48

2 g. of glycerin and 100 ml. of a hydrochloric acid-acidified bismuth solution of a concentration of 0.2 mole per liter calculated as $Bi_2O_3$, the pH of which was adjusted to 1 by addition of hydrochloric acid, were mixed with an aqueous solution of $MgCl_2 \cdot 6H_2O$ of a concentration of 3.2 moles per liter calculated as MgO. The so formed mixed liquor and another mixed liquor of 30 ml. of a sodium carbonate solution of a concentration of 2.2 moles per liter and 200 ml. of a caustic soda solution of a concentration of 4.0 moles per liter were added dropwise to a 500-ml. capacity beaker charged with 50 ml. of water. The reaction was carried out at 5° C. while maintaining the pH of the reaction liquor at 12.0–13.0. Water was removed from the resulting suspension under reduced pressure, and the residue was washed with 20 ml. of ice water and dried at 50° C. for 20 hours. Results of the analysis of the product are as follows:

Composition formula $Mg_{16}Bi_2(OH)_{32}(CO_3)_{2.5} \cdot 4.6H_2O$:

$K=5.7$
$x/y=8$
$z/(x+y)=1/7.2$

X-ray diffraction:

| $d(Å.)$ | $I/I_o$ |
|---|---|
| 7.68 | 100 |
| 3.88 | 30 |
| 2.59 | 20 |
| 1.59 | 15 |

Chemical analysis:

| | |
|---|---|
| MgO | 40.7% (16.00) |
| $Bi_2O_3$ | 29.4% (1.0) |
| $CO_2$ | 6.9% (2.48) |
| $H_2O$ | 28.2% (20.40) |

EXAMPLE 49

An aqueous solution containing 0.288 mole per liter of $SbCl_3$ calculated as $Sb_2O_3$, and an aqueous solution containing 0.144 mole per liter of $MgCl_2 \cdot 6H_2O$ calculated as MgO were sprayed uniformly on the surface of the reaction liquor from the upper portion of a reaction tank via 500 holes of 0.3 mm. diameter of a sprayer composed of a synthetic resin. The feed rates of the solutions were 22.6 ml./min. and 11.3 ml./min. respectively. The reaction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.05 mole per liter of $Na_2CO_3$ and another aqueous solution containing 1.30 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 9.5 and 9.7. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $MgSb_4(OH)_{12.7}(CO_3)_{0.67} \cdot 2.3H_2O$:

$K=5.7$
$x/y=0.25$
$z/(x+y)=1/7.5$

X-ray diffraction:

| $d(Å.)$ | $I/I_o$ |
|---|---|
| 7.19 | 100 |
| 3.60 | 30 |
| 2.63 | 20 |
| 1.51 | 15 |

Chemical analysis:

| | |
|---|---|
| MgO | 5.0% (1.00) |
| $Sb_2O_3$ | 72.1% (2.01) |
| $CO_2$ | 3.6% (0.67) |
| $H_2O$ | 19.3% (8.67) |

EXAMPLE 50

An aqueous solution containing 0.288 mole per liter of $SbCl_3$ calculated as $Sb_2O_3$ and an aqueous solution containing 0.144 mole per liter of $MgCl_2 \cdot 6H_2O$ calculated as MgO were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reaction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.06 mole per liter of $Na_2CO_3$ and another aqueous solution containing 1.30 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 9.7 and 10.0. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $MgSb_2(OH)_{7.2}(CO_3)_{0.4} \cdot 1.4H_2O$:

$K=5.7$
$x/y=0.5$
$z/(x+y)=1/7.5$

X-ray diffraction:

| $d(Å.)$ | $I/I_o$ |
|---|---|
| 7.21 | 100 |
| 3.73 | 40 |
| 2.65 | 20 |
| 1.53 | 15 |

Chemical analysis:

| | |
|---|---|
| MgO | 9.2% (1.00) |
| $Sb_2O_3$ | 66.4% (1.0) |
| $CO_2$ | 3.8% (0.38) |
| $H_2O$ | 20.5% (5.00) |

EXAMPLE 51

An aqueous solution containing 0.288 mole per liter of $SbCl_3$ and an aqueous solution containing 0.432 mole per liter of $MgCl_2 \cdot 6H_2O$ were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reaction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.08 mole per liter of $Na_2CO_3$ and another aqueous solution containing 2.2 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 10.0 and 10.2. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $Mg_3Sb_2(OH)_{10.7}(CO_3)_{0.63} \cdot 2.5H_2O$:

$K = 5.7$
$x/y = 1.5$
$z/(x+y) = 1/7.9$

X-ray diffraction:

| $d(\text{Å})$ | $I/I_o$ |
|---|---|
| 7.35 | 100 |
| 3.78 | 40 |
| 2.65 | 18 |
| 2.40 | 10 |
| 1.55 | 10 |

Chemical analysis:

| | | |
|---|---|---|
| MgO | 20.8% | (3.00) |
| $Sb_2O_3$ | 50.2% | (1.0) |
| $CO_2$ | 4.8% | (0.63) |
| $H_2O$ | 24.3% | (7.85) |

EXAMPLE 52

An aqueous solution containing 0.288 mole per liter of $SbCl_3$ and an aqueous solution containing 0.720 mole per liter of $MgCl_2 \cdot 6H_2O$ were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reaction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.14 mole per liter of $Na_2CO_3$ and another aqueous solution containing 3.25 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 10.2 and 10.4. When the pH value became stable and the concentration of the reaction liquor was constant, the suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $Mg_5Sb_2(OH)_{14.3}(CO_3)_{0.9} \cdot 3.4H_2O$:

$K = 5.7$
$x/y = 2.5$
$z/(x+y) = 1/7.8$

X-ray diffraction:

| $d(\text{Å})$ | $I/I_o$ |
|---|---|
| 7.45 | 100 |
| 3.82 | 40 |
| 2.69 | 15 |
| 2.41 | 13 |
| 1.56 | 9 |

Chemical analysis:

| | | |
|---|---|---|
| MgO | 28.0% | (5.02) |
| $Sb_2O_3$ | 40.4% | (1.0) |
| $CO_2$ | 5.4% | (0.89) |
| $H_2O$ | 26.4% | (10.58) |

EXAMPLE 53

An aqueous solution containing 0.288 mole per liter of $SbCl_3$ and an aqueous solution containing 1.01 moles per liter of $MgCl_2 \cdot 6H_2O$ were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reduction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.17 mole per liter of $Na_2CO_3$ and another aqueous solution containing 4.0 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 10.5 and 10.8. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $Mg_7Sb_2(OH)_{17.8}(CO_3)_{17.8} \cdot 3.6H_2O$:

$K = 5.7$
$x/y = 3.5$
$z/(x+y) = 1/8.2$

X-ray diffraction:

| $d(\text{Å})$ | $I/I_o$ |
|---|---|
| 7.54 | 100 |
| 3.85 | 42 |
| 2.72 | 20 |
| 2.44 | 15 |
| 1.57 | 15 |

Chemical analysis:

| | | |
|---|---|---|
| MgO | 33.3% | (7.00) |
| $Sb_2O_3$ | 34.4% | (1.0) |
| $CO_2$ | 5.8% | (1.12) |
| $H_2O$ | 26.6% | (12.51) |

EXAMPLE 54

An aqueous solution containing 0.288 mole per liter of $SbCl_3$ and an aqueous solution containing 1.44 moles per liter of $MgCl_2 \cdot 6H_2O$ were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reaction tank was a 2-liter capacity cylindrical reactor and the temperature inside the reactor was maintained at 30±1° C. The reaction system was agitated at a constant rate by a propeller stirrer. The agitation direction of the stirrer was the upward direction. From the bottom of the reactor an aqueous solution containing 0.26 mole per liter of $Na_2CO_3$ and another aqueous solution containing 5.2 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 10.7 and 11.0. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $Mg_{10}Sb_2(OH)_{22.8}(CO_3)_{1.6} \cdot 3.8H_2O$:

$K=5.7$
$x/y=5$
$z/(x+y)=1/7.5$

X-ray diffraction:

| $d$(A.) | $I/I_o$ |
|---|---|
| 7.67 | 100 |
| 3.89 | 35 |
| 2.76 | 25 |
| 2.48 | 10 |
| 1.58 | 15 |

Chemical analysis:

| | |
|---|---|
| MgO | 38.9% (10.00) |
| $Sb_2O_3$ | 28.1% (1.0) |
| $CO_2$ | 6.7% (1.58) |
| $H_2O$ | 26.4% (15.20) |

EXAMPLE 55

An aqueous solution containing 0.288 mole per liter of $SbCl_3$ and an aqueous solution containing 1.92 moles per liter of $MgCl_2 \cdot 6H_2O$ were sprayed uniformly on the surface of the reaction liquor from the upper portion of a reaction tank via 500 holes of 0.3 mm. diameter of a sprayer composed of a synthetic resin. The feed rate of each solution was 11.3 ml./min. The reaction tank was a 2-liter capacity cylindrical reactor and the temperature inside the reactor was maintained at 30±1° C. The reaction system was agitated at a constant rate by a propeller stirrer. Thhe agitation direction of the stirrer was the upward direction. From the bottom of the reactor an aqueous solution containing 0.30 mole per liter of $Na_2CO_3$ and another aqueous solution containing 6.4 moles per liter of NaOH were fed at feed rates of 22.6 ml./min. and 14.6 ml./min., respectively, through a pipe so disposed that both aqueous solutions were fed from the central portion of the bottom of the reactor. The amount of NaOH fed was so adjusted that a pH electrode would always indicate a value between 10.8 and 11.2. When the pH value became stable and the concentration of the reaction liquor was constant, the reaction suspension which overflowed was collected. The residence time of the reaction liquor in the reactor was about 33 minutes. The resulting suspension was heated at 70° C. for 5 hours and cooled. Post-treatments were conducted in the same manner as in Example 1. Results of the analysis of the product are as follows:

Composition formula $Mg_{14}Sb_2(OH)_{29.6}(CO_3)_{2.2} \cdot 4.2H_2O$:

$K=5.7$
$x/y=7$
$z/(x+y)=1/7.3$

X-ray diffraction:

| $d$(A.) | $I/I_o$ |
|---|---|
| 7.68 | 100 |
| 3.92 | 30 |
| 2.77 | 18 |
| 1.58 | 15 |

Chemical analysis:

| | |
|---|---|
| MgO | 43.6% (14.00) |
| $Sb_2O_3$ | 22.5% (1.0) |
| $CO_2$ | 7.5% (2.21) |
| $H_2O$ | 26.4% (19.00) |

EXAMPLE 56

Into 200 ml. of water 24.4 g. of $MgCl_2 \cdot 6H_2O$, 2 g. of glycerin, 6.3 g. of $BiCl_3$ and 4.4 g. of $InCl_3$ were dissolved and the pH of the resulting liquor was adjusted to 1 by addition of concentrated hydrochloric acid. Separately, a solution of 2.1 g. of $Na_2CO_3$ and 13 g. of NaOH in 200 ml. of water was prepared. Both liquors were added at 5° C. dropwise into a 500-ml. capacity beaker charged with 100 ml. of water so that the pH of the reaction liquor was maintained at 11.8–12.2. After completion of the reaction, the resulting suspension was treated in the same manner as in Example 2. Results of the analysis of the product are as follows:

Composition formula $Mg_6(BiIn)(OH)_{16}CO_3 \cdot 4H_2O$:

$K=5.7$ (Mg-$CO_3$ series)
$x/y=3$
$z/(x+y)=1/8$

X-ray diffraction:

| $d$(A.) | $I/I_o$ |
|---|---|
| 7.82 | 100 |
| 3.90 | 48 |
| 2.73 | 21 |
| 2.41 | 10 |
| 1.52 | 7 |

Chemical analysis:

| | |
|---|---|
| MgO | 27.6% (6.00) |
| $Bi_2O_3$ | 26.6% (0.50) |
| $In_2O_3$ | 15.8% (0.50) |
| $CO_2$ | 5.1% (1.01) |
| $H_2O$ | 24.8% (12.05) |

EXAMPLE 57

Into 200 ml. of water 24.4 g. of $MgCl_2 \cdot 6H_2O$, 4.4 g. of $InCl_3$ and 4.6 g. of $SbCl_3$ were dissolved. Separately 4.7 g. of $Na_2CrO_4 \cdot 4H_2O$ were dissolved in 100 ml. of water. Together with an aqueous solution containing 2.0 moles per liter of NaOH, both liquors were added dropwise to a four-neck flask charged with 100 ml. of water at room temperature under agitation in a $N_2$ gas current. The addition of the NaOH aqueous solution was controlled so that the pH of the reaction liquor was maintained at 11.8–12.3. The resulting suspension was filtered in a $N_2$ gas atmosphere, and the remaining precipitate was washed with 200 ml. of decarbonated water in a $N_2$ gas atmosphere and dried at 60° C. for 10 hours in a $N_2$ gas current. Results of the analysis of the product are as follows:

Composition formula $Mg_6(InSb)(OH)_{16}CrO \cdot 4H_2O$:

$K=11.5$ (Mg-$CrO_4$ series)
$x/y=3$
$z/(x+y)=1/8$

X-ray diffraction:

| $d$(A.) | $I/I_o$ |
|---|---|
| 7.82 | 100 |
| 3.83 | 52 |
| 2.50 | 30 |
| 2.38 | 15 |
| 1.51 | 10 |

Chemical analysis:

| | |
|---|---|
| MgO | 28.5% (6.00) |
| $In_2O_3$ | 16.4% (0.50) |
| $Sb_2O_3$ | 16.9% (0.49) |
| $CrO_4$ | 13.3% (0.97) |
| $H_2O$ | 25.1% (11.80) |

EXAMPLE 58

Into 200 ml. of water 24.4 g. of $MgCl_2 \cdot 6H_2O$, 4.4 g. of $InCl_3$ and 4.6 g. of $SbCl_3$ were dissolved. Separately, 2.1 g. of $Na_2CO_3$ were dissolved in 100 ml. of water. Together with an aqueous solution containing 2.0 moles per liter of NaOH, both liquors were added dropwise to a four-neck flask charged with 100 ml. of water at room temperature under agitation in a $N_2$ gas current. The addition of the NaOH aqueous solution was controlled so that the pH of the reaction liquor was maintained at 11.8–12.5. The resulting suspension was filtered and the remaining precipitate was washed with 200 ml. of water and dried at 60° C. for 10 hours. Results of the analysis of the product are as follows:

Composition formula $Mg_6(InSb)(OH)_{16}CO_3 \cdot 4H_2O$:

$K=11.5$ (Mg-CO$_3$ series)
$x/y=3$
$z/(x+y)=1/8$

X-ray diffraction:

| $d$(A.) | $I/I_o$ |
|---|---|
| 7.82 | 100 |
| 3.88 | 52 |
| 2.72 | 21 |
| 2.42 | 10 |
| 1.53 | 10 |

Chemical analysis:

| MgO | 31.0% (6.00) |
|---|---|
| Sb$_2$O$_3$ | 18.3% (0.49) |
| In$_2$O$_3$ | 17.8% (0.50) |
| CO$_2$ | 5.5% (0.97) |
| H$_2$O | 27.3% (11.80) |

EXAMPLE 59

5.0 g. of dried $Mg_6In_2(OH)_{16}SO_4 \cdot 4H_2O$ were packed in a burette, at the bottom of which glass wool was stuffed. A solution of 8.84 g. of K$_2$SeO$_3$ dissolved in 200 ml. of water was poured into the burette to effect ion-exchange. The product was taken out, washed with 100 ml. of cool water and dried at 70° C. Results of the analysis of the product are as follows:

Composition formula $Mg_6In_2(OH)_{16}SeO_3 \cdot 4H_2O$:

$x/y=3$
$z/(x+y)=1/8$

X-ray diffraction:

| $d$(A.) | $I/I_o$ |
|---|---|
| 8.58 | 100 |
| 4.27 | 30 |
| 2.72 | 23 |
| 2.34 | 10 |
| 1.58 | 8 |

Chemical analysis:

| MgO | 28.3% (6.10) |
|---|---|
| In$_2$O$_3$ | 32.0% (1.0) |
| SeO$_3$ | 14.6% (1.00) |
| SO$_4$ | 0.04% (—) |
| H$_2$O | 25.1% (12.10) |

EXAMPLE 60

10.0 g. of dried $Mg_6Co_2(OH)_{16}CO_3 \cdot 4H_2O$ were ion-exchanged in the same manner as in Example 59 by using a solution of 5.0 g. of Na$_2$SeO$_3 \cdot$5H$_2$O dissolved in 200 ml. of water. Results of the analysis of the product are as follows:

Composition formula $Mg_6Co_2(OH)_{16}SeO_3 \cdot 4H_2O$:

$x/y=3$
$z/(x+y)=1/8$

X-ray diffraction:

| $d$(A.) | $I/I_o$ |
|---|---|
| 8.11 | 100 |
| 4.11 | 45 |
| 2.58 | 32 |
| 1.53 | 15 |

Chemical analysis:

| MgO | 32.3% (6.00) |
|---|---|
| Co$_2$O$_3$ | 22.2% (1.0) |
| SeO$_3$ | 16.6% (0.98) |
| CO$_2$ | 0.02% (—) |
| H$_2$O | 28.9% (12.00) |

EXAMPLE 61

10 g. of a dried product of $Mg_6Sb_2(OH)_{16}CrO_4 \cdot 4H_2O$ were ion-exchanged in the same manner as in Example 59 by using a solution of 3.0 g. of K$_2$CrO$_4$ dissolved in 200 ml. of water. Results of the analysis of the product are as follows:

Composition formula $Mg_6Sb_2(OH)_{16}CrO_4 \cdot 4H_2O$:

$x/y=3$
$z/(x+y)=1/8$

X-ray diffraction:

| $d$(A.) | $I/I_o$ |
|---|---|
| 7.49 | 100 |
| 3.85 | 45 |
| 2.68 | 20 |
| 2.43 | 15 |
| 1.57 | 8 |

Chemical analysis:

| MgO | 27.9% (6.00) |
|---|---|
| Sb$_2$O$_3$ | 33.7% (1.0) |
| CrO$_4$ | 13.4% (1.00) |
| CO$_2$ | 0.09% (—) |
| H$_2$O | 25.0% (12.00) |

EXAMPLE 62

10.0 g. of a dried product of $Mg_6Bi_2(OH)_{16}CO_3 \cdot 4H_2O$ were packed in a burette, at the bottom of which glass wool was stuffed. A solution of 7.2 g. of Na$_2$Cr$_2$O$_7 \cdot$2H$_2$O dissolved in 200 ml. of water was poured from the top of the burette. After the whole solution had been poured, the sample was taken out from the burette, washed with 150 ml. of water and dried at 80° C. Results of the analysis of the product are as follows:

Composition formula $Mg_6Bi_2(OH)_{16}Cr_2O_7 \cdot 4H_2O$:

$x/y=3$
$z/(x+y)=1/8$

X-ray diffraction:

| $d$(A.) | $I/I_o$ |
|---|---|
| 7.49 | 100 |
| 3.72 | 45 |
| 2.58 | 25 |
| 2.35 | 13 |
| 1.52 | 8 |

Chemical analysis:

| MgO | 21.3% (6.00) |
|---|---|
| Bi$_2$O$_3$ | 40.9% (1.0) |
| Cr$_2$O$_7$ | 19.0% (0.98) |
| CO$_2$ | 0.02% (—) |
| H$_2$O | 18.8% (11.62) |

What we claim is:

1. A composite metal hydroxide expressed by the following composition formula:

$$Mg_{0.5-16}M_2^{3+}(OH)_{7-2z-38-2z}(A^{2-})_z \cdot 0.625\text{—}18H_2O$$

wherein M$^{3+}$ is a trivalent metal selected from the group consisting of scandium, gallium, yttrium, indium, lanthanum, thallium, titanium, metals of group V of the Periodic Table, manganese, cobalt, nickel, ruthenium, rhodium, osmium, iridium, rare earth metals and americium; A$^{2-}$ represents a divalent inorganic anion selected from the group consisting of CO$_3^=$, CrO$_4^=$, Cr$_2$O$_7^=$, B$_4$O$_7^=$, MoO$_4^=$, SeO$_3^=$, SeO$_4^=$, GeO$_3^=$, SiO$_3^=$, HPO$_4^=$, NH$_4$PO$_4^=$, SiF$_6^=$, Pt(CN)$_4^=$, SO$_3^=$, S$_2$O$_3^=$ and S$_2$O$_6^=$; wherein

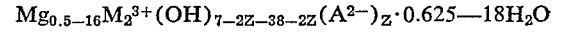

said composite metal hydroxide having a layer crystal structure expressed substantially by the following X-ray diffraction pattern:

| $d$(Å.) | Relative intensity ($I/I_o$) |
|---|---|
| 7.8±3.2 | 100 |
| 3.9±1.6 | 5–80 |
| 2.6±1.2 | 5–60 |
| 1.54±0.05 | 2–10 |
| 1.51±0.05 | 2–10 | and exhibiting an endothermic peak owing to isolation of crystal water at a temperature exceeding 170° C. in the differential thermal analysis.

2. The composite metal hydroxide of claim 1, which has a composition expressed by the following formula:

$$Mg_{2-16}M_2^{3+}(OH)_{7.5-34}A^{2-}{}_{0.5-2.5} \cdot 1.5\text{--}6H_2O$$

wherein $M^{3+}$ is selected from vanadium, antimony and bismuth, and $A^{2-}$ is selected from $CO_3^=$, $CrO_4^=$, $Cr_2O_7^=$, $MoO_4^=$, $SO_3^=$, $SiO_3^=$, $B_4O_7^=$ and $SeO_4^=$.

3. The composite metal hydroxide of claim 1, which has a composition expressed by the following formula:

$$Mg_{2-16}M_2^{3+}(OH)_{7.5-34}A^{2-}{}_{0.5-2.5} \cdot 1.5\text{--}6H_2O$$

wherein $M^{3+}$ is selected from cobalt and nickel, and $A^{2+}$ is selected from $CO_3^=$, $CrO_4^=$, $Cr_2O_7^=$, $MoO_4^=$, $SO_3^-$, $SiO_3^=$, $SeO_4^=$ and $B_4O_7^=$.

4. The composite metal hydroxide of claim 1, which has a composition expressed by the following formula:

$$Mg_{2-16}Mn_2(OH)_{7.5-34}A^{2-}{}_{0.5-2.5} \cdot 1.5\text{--}6H_2O$$

wherein $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

5. The composite metal hydroxide, of claim 1, which has a composition expressed by the following formula:

$$Mg_{2-16}M_2^{3+}(OH)_{7.5-34}A^{2-}{}_{0.5-2.5} \cdot 1.5\text{--}6H_2O$$

wherein $M^{3+}$ is selected from indium, gallium, scandium and yttrium and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

References Cited
UNITED STATES PATENTS

| | | | |
|---|---|---|---|
| 3,539,306 | 11/1970 | Kumuca et al. | 23—315 |
| 3,347,640 | 10/1967 | Higuchi et al. I | 23—315 |
| 3,347,641 | 10/1967 | Higuchi et al. II | 23—315 |
| 3,573,006 | 3/1971 | Shih et al. | 23—315 |
| 2,958,626 | 11/1960 | Schenck et al. | 23—315 X |
| 3,099,524 | 7/1963 | Grossmith | 23—315 |
| 2,797,978 | 7/1957 | Beekman | 23—50 |

CARL D. QUARFORTH, Primary Examiner

R. L. TATE, Assistant Examiner

U.S. Cl. X.R.

106—306; 252—62.64, 301.1 R; 423—253, 277, 308, 331, 365, 430, 464, 508, 518, 593, 595, 606, 618